United States Patent
Yoshimi

(10) Patent No.: US 7,685,835 B2
(45) Date of Patent: Mar. 30, 2010

(54) AIR CONDITIONING SYSTEM

(75) Inventor: Manabu Yoshimi, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 574 days.

(21) Appl. No.: 11/587,097

(22) PCT Filed: Apr. 28, 2005

(86) PCT No.: PCT/JP2005/008191

§ 371 (c)(1),
(2), (4) Date: Oct. 20, 2006

(87) PCT Pub. No.: WO2005/106342

PCT Pub. Date: Nov. 10, 2005

(65) Prior Publication Data

US 2007/0234744 A1   Oct. 11, 2007

(30) Foreign Application Priority Data

Apr. 28, 2004   (JP)   ............... 2004-134353

(51) Int. Cl.
*F25B 13/00*   (2006.01)
(52) U.S. Cl. ............... 62/324.1; 91/434; 91/238.6
(58) Field of Classification Search ............... 62/324.1, 62/238.6, 91, 434
See application file for complete search history.

(56) References Cited

U.S. PATENT DOCUMENTS

| | | | | |
|---|---|---|---|---|
| 4,043,141 A | * | 8/1977 | Levy et al. | 62/91 |
| 4,289,272 A | * | 9/1981 | Murase et al. | 236/91 D |
| 4,293,092 A | * | 10/1981 | Hatz et al. | 237/12.1 |
| 5,368,786 A | * | 11/1994 | Dinauer et al. | 261/130 |
| 6,668,572 B1 | * | 12/2003 | Seo et al. | 62/238.6 |

FOREIGN PATENT DOCUMENTS

| | | |
|---|---|---|
| DE | 2237852 | 2/1974 |
| JP | 55-31459 Y2 | 7/1980 |
| JP | 61-66715 U | 5/1986 |
| JP | 62-91134 U | 6/1987 |
| JP | 02-225924 A | 9/1990 |
| JP | 03-177728 A | 8/1991 |
| JP | 05-306849 A | 11/1993 |
| JP | 2000-257936 A | 9/2000 |
| JP | 2000-283535 A | 10/2000 |
| JP | 2001012774 A * | 1/2001 |
| JP | 2001-304614 A | 10/2001 |

(Continued)

*Primary Examiner*—Cheryl J Tyler
*Assistant Examiner*—Jonathan Koagel
(74) *Attorney, Agent, or Firm*—Global IP Counselors

(57) ABSTRACT

An air conditioning system includes a heat source unit, an air supply device that supplies the outside air to the room as the ventilation air, a water supply type humidifier for humidifying the ventilation air, a heating medium circuit, and a supply water heating device. The heat source unit heats a heating medium that is used for heating the room in a heating medium—refrigerant heat exchanger. The heating medium circuit includes at least one room heating device that releases the heat of the heating medium heated in the heating medium—refrigerant heat exchanger into the room, and circulates the heating medium between the room heating device and the heating medium—refrigerant heat exchanger. The supply water heating device uses the heat generated from the heat source unit in order to heat water to be used in the humidifier.

21 Claims, 16 Drawing Sheets

FOREIGN PATENT DOCUMENTS

| | | |
|---|---|---|
| JP | 2002-357340 A | 12/2002 |
| JP | 2003-050035 A | 2/2003 |
| JP | 2003-050050 A | 2/2003 |
| JP | 2003-172523 A | 6/2003 |
| JP | 2004-003801 A | 1/2004 |

* cited by examiner

AIR CONDITIONING SYSTEM

CROSS-REFERENCE TO RELATED APPLICATIONS

This U.S. National stage application claims priority under 35 U.S.C. §119(a) to Japanese Patent Application No. 2004-134353, filed in Japan on Apr. 28, 2004, the entire contents of which are hereby incorporated herein by reference.

TECHNICAL FIELD

The present invention relates to an air conditioning system. More specifically, the present invention relates to an air conditioning system capable of heating the room.

BACKGROUND ART

As an air conditioning system capable of heating the room, conventionally known is a system configured by connecting room heating devices such as a radiator and a fan convector to a heat source unit having a vapor compression type refrigerant circuit (for example, see Japanese Patent Application Publication Nos. 2003-50035, 2003-172523 and 2003-50050). Such an air conditioning system heats the room by heating the floor and indoor air.

In addition, as a heat source unit of such an air conditioning system, a unit having a refrigerant circuit that uses $CO_2$ as the refrigerant is used in some cases. In such a heat source unit that uses $CO_2$ as the refrigerant, the refrigerant temperature on a discharge side of a compressor can be increased, and therefore, for example, when an air conditioning system is configured such that the heat of a heating medium heated by a utilization side heat exchanger in the heat source unit is released into the room in the room heating devices, the temperature level that can be used for heating a room in the room heating devices can be increased. This will achieve comfortable room heating.

SUMMARY OF THE INVENTION

When an air conditioning system as described above is used for air conditioning in a house with high airtightness, the minimally necessary ventilation in the room needs to be performed in order to maintain indoor air quality (hereinafter referred to as IAQ). However, when the temperature of outdoor air is low such as during the winter season (hereinafter referred to as a low outdoor air temperature period), outdoor air whose temperature is lower than that of indoor air will be supplied to the room as the ventilation air, so that a heat load due to ventilation in the room (hereinafter referred to as a ventilation heat load) will be generated. This ventilation heat load will be treated by the room heating devices after the ventilation air is supplied to the room and mixed with indoor air, which consequently causes the room occupant to feel discomfort due to the supply of low temperature ventilation air (hereinafter referred to as a cold draft). In particular, in recent years, there are more houses having high airtightness and high heat insulation properties, in which high heat insulation properties are added besides high airtightness. In such houses having high airtightness and high heat insulation properties, improved heat insulation properties can reduce the total amount of heat load; however, the ventilation heat load necessary for maintenance of IAQ cannot be reduced. Therefore, the proportion of the ventilation heat load to the total amount of heat load to be treated in the air conditioning system is relatively large.

Further, when the temperature of the outdoor air is low such as during the winter season (hereinafter referred to as a low outdoor air temperature period), outdoor air whose absolute humidity is lower than that of indoor air will be supplied to the room as the ventilation air. As a result, the humidity in the room will decrease, causing a problem that the room will be dry, when trying to ensure the required amount of ventilation in order to maintain the IAQ as described above.

In addition, when the above described type of a heat source unit that uses $CO_2$ as the refrigerant is used, the temperature level that can be used in the room heating devices can be increased, however, the temperature difference between an inlet and an outlet of the utilization side heat exchanger will be reduced, resulting in a reduced coefficient of performance (hereinafter referred to as COP) of the heat source unit. Accordingly, it is desired to improve the COP in an air conditioning system capable of heating the room, which uses a heat source unit that uses $CO_2$ as the refrigerant.

Therefore, an object of the present invention is to prevent, in an air conditioning system capable of heating the room, a decrease in the humidity in the room caused by the ventilation air that is supplied to the room for ventilation in the room.

An air conditioning system according to a first aspect of the present invention is an air conditioning system capable of heating the room, comprising a heat source unit, an air supply device, a humidifier, a heating medium circuit, and a supply water heating device. The heat source unit includes a vapor compression type refrigerant circuit having a compressor, a heat source side heat exchanger, an expansion mechanism, and a utilization side heat exchanger, and is capable of heating, in the utilization side heat exchanger, a heating medium that is used for heating the room. The air supply device supplies an outdoor air to the room as a ventilation air. The humidifier is a water supply type humidifier that humidifies the ventilation air. The heating medium circuit includes at least one room heating device that releases into the room the heat of the heating medium heated in the utilization side heat exchanger, and circulates the heating medium between the room heating device and the utilization side heat exchanger. The supply water heating device uses the heat generated from the heat source unit to heat water to be used in the humidifier.

In this air conditioning system, the high temperature and high pressure refrigerant compressed in and discharged from the compressor heats the heating medium in the utilization side heat exchanger. The heating medium heated in this utilization side heat exchanger is sent to at least one room heating device, and used to heat the room by releasing the heat of the heating medium into the room, and the heating medium used in the room heating device to heat the room and the ventilation air is again returned to the utilization side heat exchanger. On the other hand, the refrigerant cooled in the utilization side heat exchanger by heating the heating medium is decompressed by the expansion mechanism, heated in the heat source side heat exchanger, converted into a low pressure refrigerant, and then again sucked into the compressor. In addition, water to be used in the humidifier is heated in the supply water heating device by using the heat generated from the heat source unit. Then, the heated water is used in the humidifier to humidify the ventilation air that is supplied to the room by the air supply device. Note that the room heating device includes, for example, a radiator, a fan convector, and a floor heating device. In this way, this air conditioning system comprises the supply water heating device that heats water to be used in the water supply type humidifier, so that it is possible to efficiently humidify the ventilation air by using preheated water and supply this ventilation air to the room, when heating the room. Accordingly, it will be possible to prevent a decrease in the humidity in the room caused by the ventilation air that is supplied to the room for ventilation in the room, therefore enhancing the comfort of the room.

An air conditioning system according to a second aspect of the present invention is the air conditioning system according to the first aspect of the present invention, in which the supply water heating device is connected to the heating medium circuit. The heating medium circuit is connected to the utilization side heat exchanger such that the heating medium heated in the utilization side heat exchanger is supplied to the room heating device and then supplied to the supply water heating device.

In this air conditioning system, the supply water heating device is connected to the heating medium circuit, and the heating medium circuit is connected to the utilization side heat exchanger such that the heating medium heated in the utilization side heat exchanger is supplied to the room heating device and then supplied to the supply water heating device. Consequently, the room heating device can use the heat of a high temperature heating medium that just has been heated in the utilization side heat exchanger, and the supply water heating device can use the heat of the heating medium cooled by releasing its heat into the room in the room heating device. Here, for example, when the tap water is used as water to be used in the humidifier, the temperature of the tap water is lower than that of the room air, and so the tap water may be heated in the supply water heating device by using the heating medium cooled by releasing its heat into the room by the room heating device. Then, the heating medium used in the supply water heating device to heat water to be used in the humidifier is further cooled by heating the water, and then returned to the utilization side heat exchanger. In this way, in this air conditioning system, the heating medium cooled by releasing its heat in the room heating device is supplied to the supply water heating device and used to heat water to be used in the humidifier. Consequently, the temperature difference between the inlet and the outlet of the utilization side heat exchanger can be increased, therefore improving the COP of the heat source unit.

An air conditioning system according to a third aspect of the present invention is the air conditioning system according to the first aspect of the present invention, in which the supply water heating device is connected to the heating medium circuit. The heating medium circuit is connected to the utilization side heat exchanger such that the heating medium heated in the utilization side heat exchanger is supplied to the supply water heating device and then to the room heating device.

In this air conditioning system, the supply water heating device is connected to the heating medium circuit, and the heating medium circuit is connected to the utilization side heat exchanger such that the heating medium heated in the utilization side heat exchanger is supplied to the supply water heating device and then to the room heating device. Accordingly, the supply water heating device can use the heat of a high temperature heating medium that just has been heated in the utilization side heat exchanger, and the room heating device can use the heat of the heating medium cooled by releasing its heat into the water in the supply water heating device. Here, in order to efficiently humidify the ventilation air in the humidifier, it is desirable that water is heated to as high a temperature as possible. Therefore, for example, when the tap water whose temperature is lower than that of the room air is used as water to be used in the humidifier, the tap water may be heated in the supply water heating device to a high temperature by using the heat of a high temperature heating medium that just has been heated in the utilization side heat exchanger. Then, the heating medium used in the supply water heating device to heat water to be used in the humidifier is cooled by heating water and consequently used in the room heating device, and then returned to the utilization side heat exchanger. In this way, in this air conditioning system, a high temperature heating medium that just has been heated in the utilization side heat exchanger is supplied to the supply water heating device to heat water to be used in the humidifier. Consequently, it will be possible to increase the temperature difference between the inlet and the outlet of the utilization side heat exchanger, therefore improving the COP of the heat source unit.

An air conditioning system according to a fourth aspect of the present invention is the air conditioning system according to the first aspect of the present invention, in which the supply water heating device includes a first supply water heating device and a second supply water heating device. The first and second supply water heating devices are connected to the heating medium circuit. The heating medium circuit is connected to the utilization side heat exchanger such that the heating medium heated in the utilization side heat exchanger is sequentially supplied to the first supply water heating device, the room heating device, and the second supply water heating device.

In this air conditioning system, the first and second supply water heating devices are connected to the heating medium circuit, and the heating medium circuit is connected to the utilization side heat exchanger such that the heating medium heated in the utilization side heat exchanger is sequentially supplied to the first supply water heating device, the room heating device, and the second supply water heating device. Consequently, the first supply water heating device can use the heat of a high temperature heating medium that just has been heated in the utilization side heat exchanger; the room heating device can use the heat of the heating medium cooled in the first supply water heating device by releasing its heat into the room; and the second supply water heating device can use the heat of the heating medium cooled by releasing its heat into the room in the room heating device. Here, for example, when the tap water is used as water to be used in the humidifier, the temperature of the tap water is lower than that of the room air, and so the tap water may be heated in the second supply water heating device by using the heating medium cooled by releasing its heat into the room in the room heating device. Further, in order to efficiently humidify the ventilation air in the humidifier, it is desirable that water is heated to as high a temperature as possible. Therefore, the tap water may be heated in the first supply water heating device to a high temperature by using the heat of a high temperature heating medium that just has been heated in the utilization side heat exchanger. Then, the heating medium used in the first supply water heating device to heat water to be used in the humidifier is first cooled by heating water to be used in the humidifier, cooled by being used in the room heating device, further cooled by being used in the second supply water heating device to heat water to be used in the humidifier, and then returned to the utilization side heat exchanger. In this way, in this air conditioning system, by comprising the first and second supply water heating devices, the heat of the heating medium that just has been heated in the utilization side heat exchanger and the heat of the heating medium cooled by being used in the room heating device are used in order to heat water to be used in the humidifier. Consequently, the temperature difference between the inlet and the outlet of the utilization side heat exchanger can be increased, therefore improving the COP of the heat source unit.

An air conditioning system according to a fifth aspect of the present invention is the air conditioning system according to the first aspect of the present invention, in which the supply water heating device is connected to the refrigerant circuit such that the refrigerant sent from the utilization side heat exchanger to an expansion mechanism is supplied.

In this air conditioning system, the supply water heating device is connected to the refrigerant circuit such that the refrigerant sent from the utilization side heat exchanger to the expansion mechanism is supplied. Therefore, the room heating device can use the heat of a high temperature heating medium that just has been heated in the utilization side heat exchanger, and the supply water heating device can use the heat of the refrigerant cooled in the utilization side heat exchanger by heating the heating medium that is sent to the room heating device. Here, for example, when the tap water is used as water to be used in the humidifier, the temperature of the tap water is lower than that of the room air, and so the tap water may be heated in the supply water heating device by using the refrigerant cooled in the utilization side heat exchanger by heating the heating medium that is sent to the room heating device. Then, the refrigerant used in the supply water heating device to heat water to be used in the humidifier is further cooled by heating water, and then sent to the expansion mechanism. In this way, in this air conditioning system, the refrigerant cooled in the utilization side heat exchanger by heating the heating medium is supplied to the supply water heating device and used to heat water to be used in the humidifier. Consequently, the temperature difference between the inlet and the outlet of the utilization side heat exchanger can be increased, therefore improving the COP of the heat source unit.

An air conditioning system according to a sixth aspect of the present invention is the air conditioning system according to the first aspect of the present invention, in which the supply water heating device is connected to the refrigerant circuit such that the refrigerant sent from the compressor to the utilization side heat exchanger is supplied.

In this air conditioning system, the supply water heating device is connected to the refrigerant circuit such that the refrigerant sent from the compressor to the utilization side heat exchanger is supplied. Consequently, the supply water heating device can use the heat of the high temperature refrigerant that just has been compressed in and discharged from the compressor, and the room heating device can use the heat of the heating medium heated in the supply water heating device by using the refrigerant cooled by heating water. Here, in order to efficiently humidify the ventilation air in the humidifier, it is desirable that water is heated to as high a temperature as possible. Therefore, for example, when the tap water whose temperature is lower than that of the room air is used as water to be used in the humidifier, the tap water may be heated in the supply water heating device to a high temperature by using the heat of the refrigerant compressed in and discharged from the compressor. Then, the refrigerant used in the supply water heating device to heat water to be used in the humidifier is cooled by heating water and then, in the utilization side heat exchanger, the refrigerant heats the heating medium that is sent to the room heating device. In this way, in this air conditioning system, the refrigerant compressed in and discharged from the compressor is supplied to the supply water heating device and used to heat water to be used in the humidifier. Consequently, it will be possible to increase the temperature difference between the inlet and the outlet of the utilization side heat exchanger, therefore improving the COP of the heat source unit.

An air conditioning system according to a seventh aspect of the present invention is the air conditioning system according to the first aspect of the present invention, in which the supply water heating device includes a first supply water heating device and a second supply water heating device. The first supply water heating device is connected to the refrigerant circuit such that the refrigerant sent from the compressor to the utilization side heat exchanger is supplied. The second supply water heating device is connected to the refrigerant circuit such that the refrigerant sent from the utilization side heat exchanger to the expansion mechanism is supplied.

In this air conditioning system, the first supply water heating device is connected to the refrigerant circuit such that the refrigerant sent from the compressor to the utilization side heat exchanger is supplied, and the second supply water heating device is connected to the refrigerant circuit such that the refrigerant sent from the utilization side heat exchanger to the expansion mechanism is supplied. In other words, connection to the utilization side heat exchanger is made such that the refrigerant compressed in and discharged from the compressor is supplied to the first supply water heating device to heat water to be used in the humidifier, cooled in the utilization side heat exchanger by heating the heating medium that is sent to the room heating device, and then supplied to the second supply water heating device. Accordingly, the first supply water heating device can use the heat of the high temperature refrigerant that just has been compressed in and discharged from the compressor; the room heating device can use the heat of the heating medium heated in the first supply water heating device by the refrigerant cooled by being used to heat water; and the second supply water heating device can use the heat of the refrigerant cooled by heating the heating medium that is sent to the room heating device. Here, for example, when the tap water is used as water to be used in the humidifier, the temperature of the tap water is lower than that of the room air, and so the tap water may be heated in the second supply water heating device by using the refrigerant cooled by heating the heating medium that is sent to the room heating device. Further, in order to efficiently humidify the ventilation air in the humidifier, it is desirable that water is heated to as high a temperature as possible. Therefore, the tap water may be heated in the first supply water heating device to a high temperature by using the heat of the high temperature refrigerant that just has been compressed in and discharged from the compressor. Then, the refrigerant used in the first supply water heating device to heat water to be used in the humidifier is cooled by heating water to be used in the humidifier, cooled by heating the heating medium that is sent to the room heating device, further cooled by being used in the second supply water heating device to heat water to be used in the humidifier, and then sent to the expansion mechanism. In this way, in this air conditioning system, by comprising the first and second supply water heating devices, the heat of the heating medium that just has been compressed in and discharged from the compressor and the heat of the heating medium cooled by being used in the room heating device are used in order to heat water to be used in the humidifier. Consequently, the temperature difference between the inlet and the outlet of the utilization side heat exchanger can be increased, therefore improving the COP of the heat source unit.

An air conditioning system according to an eighth aspect of the present invention is the air conditioning system according to the first aspect of the present invention, in which the supply water heating device includes a first supply water heating device and a second supply water heating device. The first supply water heating device is connected to the refrigerant circuit such that the refrigerant sent from the compressor to the utilization side heat exchanger is supplied. The second supply water heating device is connected to the heating medium circuit. The heating medium circuit is connected to the utilization side heat exchanger such that the heating medium heated in the utilization side heat exchanger is sequentially supplied to the room heating device and the second supply water heating device.

In this air conditioning system, the first supply water heating device is connected to the refrigerant circuit such that the refrigerant sent from the compressor to the utilization side heat exchanger is supplied; the second supply water heating device is connected to the heating medium circuit; and the heating medium circuit is connected to the utilization side heat exchanger such that the heating medium heated in the utilization side heat exchanger is sequentially supplied to the room heating device and the second supply water heating device. Consequently, the first supply water heating device can use the heat of the high temperature refrigerant that just has been compressed in and discharged from the compressor; the room heating device can use the heat of the heating medium heated in the first supply water heating device by the refrigerant cooled by being used to heat water; and the second supply water heating device can use the heat of the heating medium used in the room heating device. Here, for example, when the tap water is used as water to be used in the humidifier, the temperature of the tap water is lower than that of the room air, and so the tap water may be heated in the second supply water heating device by using the refrigerant cooled by heating the heating medium that is sent to the room heating device. Further, in order to efficiently humidify the ventilation air in the humidifier, it is desirable that water is heated to as high a temperature as possible. Therefore, the tap water may be heated in the first supply water heating device to a high temperature by using the heat of the high temperature refrigerant that just has been compressed in and discharged from the compressor. Then, the refrigerant used in the first supply water heating device to heat water to be used in the humidifier is cooled by heating water to be used in the humidifier, cooled by heating the heating medium that is sent to the room heating device, further cooled by being used in the second supply water heating device to heat water to be used in the humidifier, and then sent to the expansion mechanism. In this way, in this air conditioning system, by comprising the first and second supply water heating devices, the heat of the refrigerant that just has been compressed in and discharged from the compressor and the heat of the heating medium cooled by being used in the room heating device are used in order to heat water to be used in the humidifier. Consequently, the temperature difference between the inlet and the outlet of the utilization side heat exchanger can be increased, therefore improving the COP of the heat source unit.

An air conditioning system according to a ninth aspect of the present invention is the air conditioning system according to the first aspect of the present invention, in which the supply water heating device includes a first supply water heating device and a second supply water heating device. The first supply water heating device is connected to the heating medium circuit. The heating medium circuit is connected to the utilization side heat exchanger such that the heating medium heated in the utilization side heat exchanger is sequentially supplied to the first supply water heating device and the room heating device. The second supply water heating device is connected to the refrigerant circuit such that the refrigerant sent from the utilization side heat exchanger to the expansion mechanism is supplied.

In this air conditioning system, the first supply water heating device is connected to the heating medium circuit; the heating medium circuit is connected to the utilization side heat exchanger such that the heating medium heated in the utilization side heat exchanger is sequentially supplied to the first supply water heating device and the room heating device; and the second supply water heating device is connected to the refrigerant circuit such that the refrigerant sent from the utilization side heat exchanger to the expansion mechanism is supplied. Consequently, the first supply water heating device can use the heat of a high temperature heating medium that just has been heated in the utilization side heat exchanger; the room heating device can use the heat of the heating medium cooled by releasing its heat into the room in the first supply water heating device; and the second supply water heating device can use the heat of the refrigerant cooled by heating the heating medium that is sent to the first supply water heating device and the room heating device. Here, for example, when the tap water is used as water to be used in the humidifier, the temperature of the tap water is lower than that of the room air, and so the tap water may be heated in the second supply water heating device by using the refrigerant cooled by heating the heating medium that is sent to the first supply water heating device and the room heating device. Further, in order to efficiently humidify the ventilation air in the humidifier, it is desirable that water is heated to as high a temperature as possible. Therefore, the tap water may be heated in the first supply water heating device to a high temperature by using the heat of a high temperature heating medium that just has been heated in the utilization side heat exchanger. Then, the heating medium used in the first supply water heating device to heat water to be used in the humidifier is cooled by heating water to be used in the humidifier, and used in the room heating device. Then, the heating medium is returned to the utilization side heat exchanger, after the refrigerant cooled by heating the heating medium that is sent to the first supply water heating device and the room heating device is cooled by being used in the second supply water heating device to heat water to be used in the humidifier. In this way, in this air conditioning system, by comprising the first and second supply water heating devices, the heat of the heating medium that just has been heated in the utilization side heat exchanger, and the heat of the refrigerant cooled in the utilization side heat exchanger by heating the heating medium that is sent to the first supply water heating device and the room heating device are used in order to heat water to be used in the humidifier. Consequently, the temperature difference between the inlet and the outlet of the utilization side heat exchanger can be increased, therefore improving the COP of the heat source unit.

An air conditioning system according to a tenth aspect of the present invention is the air conditioning system according to any one of the first to ninth aspects of the present invention, in which the humidifier includes a moisture permeable film that allows moisture to permeate therethrough, and water heated in the supply water heating device is caused to contact with the ventilation air via the moisture permeable film, thereby enabling to humidify the ventilation air.

Since this air conditioning system is provided with the humidifier that uses the moisture permeable film, it is possible to humidify the ventilation air by supplying water heated in the supply water heating device to the moisture permeable film and by causing this water to contact with the ventilation air via the moisture permeable film.

An air conditioning system according to an eleventh aspect of the present invention is the air conditioning system according to any one of the first to ninth aspects of the present invention, in which the heating medium that flows through the heating medium circuit is water. The humidifier is connected to the heating medium circuit, provided with the moisture permeable film that allows moisture to permeate therethrough, and capable of both heating and humidifying the ventilation air by causing water as the heating medium that circulates in the heating medium circuit to contact with the ventilation air via the moisture permeable film.

In this air conditioning system, the humidifier that uses the moisture permeable film can both heat and humidify the ventilation air by causing water as the heating medium that circulates in the heating medium circuit to contact with the ventilation air via the moisture permeable film. Accordingly, the humidifier comprises a function of the supply water heating device. In this way, for example, a water supply pipe for supplying water to the humidifier can be simplified, and this will enable simplification of the configuration of the air conditioning system.

An air conditioning system according to a twelfth aspect of the present invention is the air conditioning system according to the eleventh aspect of the present invention, in which the heating medium circuit comprises a first divided heating medium circuit that circulates the heating medium between the humidifier and the utilization side heat exchanger, and a second divided heating medium circuit that circulates the heating medium between the room heating device and the utilization side heat exchanger.

In this air conditioning system, the first divided heating medium circuit to which the humidifier is connected is a system different from the second divided heating medium circuit to which the room heating device is connected, so that it is possible to make the second divided heating medium circuit as a closed circulation circuit.

An air conditioning system according to a thirteenth aspect of the present invention is the air conditioning system according to any one of the first to the twelfth aspects of the present invention, in which the refrigerant that flows through the refrigerant circuit is $CO_2$.

In this air conditioning system, $CO_2$ is used as the refrigerant that flows through the vapor compression type refrigerant circuit in the heat source unit, so that the refrigerant temperature on the discharge side of the compressor can be increased, and the temperature level that can be used in the room heating device can be increased. This will achieve comfortable room heating.

DETAILED DESCRIPTION OF THE PREFERRED EMBODIMENTS

Selected embodiments of an air conditioning system according to the present invention will be described hereinafter with reference to the drawings.

(1) Configuration of the Air Conditioning System

Figure 1:
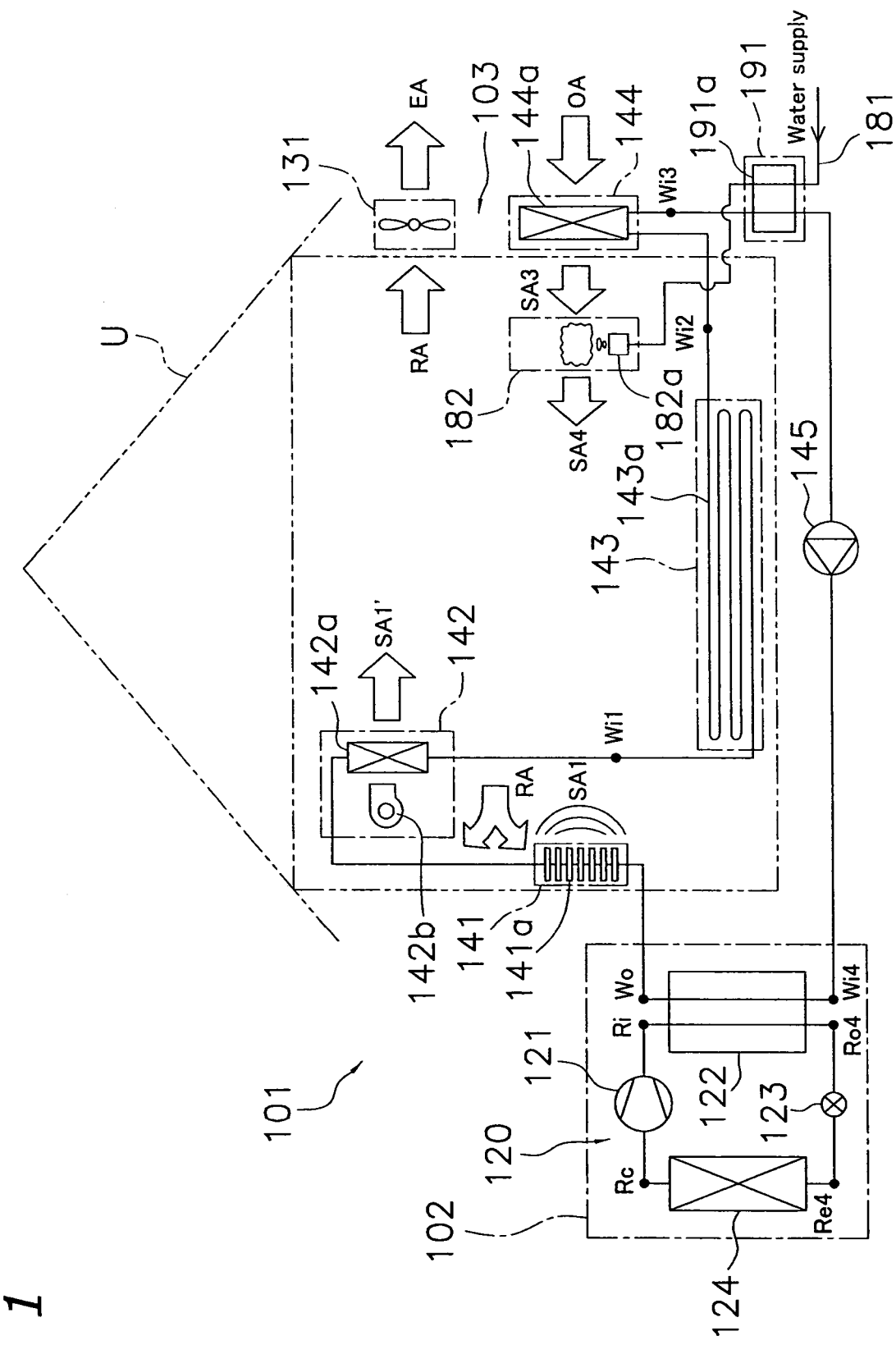
FIG. 1 is a schematic block diagram of an air conditioning system according to an embodiment of the present invention.

FIG. 1 is a schematic block diagram of an air conditioning system 101 according to an embodiment of the present invention. The air conditioning system 101 is a system capable of heating the room by operating a vapor compression type refrigerating cycle.

The air conditioning system 101 mainly comprises a heat source unit 102, an air supply device 103, a heating medium circuit 104, and a humidifier 182.

<Heat Source Unit>

The heat source unit 102 is installed outside, for example, is provided with a vapor compression type refrigerant circuit 120 that mainly includes a compressor 121, a heating medium—refrigerant heat exchanger 122 as a utilization side heat exchanger, an expansion mechanism 123, and a heat source side heat exchanger 124, and is capable of heating, in the heating medium—refrigerant heat exchanger 122, a heating medium that is used to heat the room in a building U.

The compressor 121 is a compressor that is rotatably driven by a drive mechanism such as an electric motor so as to compress a low pressure refrigerant and discharge the refrigerant as the high temperature and high pressure refrigerant.

The expansion mechanism 123 is an electric expansion valve that decompresses the refrigerant that flows out from the heating medium—refrigerant heat exchanger 122.

The heat source side heat exchanger 124 is a heat exchanger that evaporates the refrigerant decompressed by the expansion mechanism 123 by exchanging heat between the refrigerant and water or outdoor air as a heat source.

The heating medium—refrigerant heat exchanger 122 is a heat exchanger that heats the heating medium by exchanging heat between the high temperature and high pressure refrigerant compressed by and discharged from the compressor 121 and the heating medium that circulates in the heating medium circuit 104. In addition, in the present embodiment, the heating medium—refrigerant heat exchanger 122 has a passage through which the heating medium and the refrigerant flow such that the heating medium and the refrigerant are in counter current flow.

Here, as an operating refrigerant in the refrigerant circuit 120 in the heat source unit 102, it is possible to use HCFC refrigerant, HFC refrigerant, HC refrigerant, and $CO_2$, however, in the present embodiment, $CO_2$ having a low critical temperature is used, and it is possible to achieve a supercritical refrigerating cycle, in which the pressure of the refrigerant on the discharge side of the compressor 121 is equal to or higher than the critical pressure of the refrigerant. In such a supercritical refrigerating cycle that uses $CO_2$ as the refrigerant, it is possible to increase the refrigerant temperature on the discharge side of the compressor 121, that is, the refrigerant temperature at a refrigerant inlet of the heating medium—refrigerant heat exchanger 122, because of an increase in the pressure of the refrigerant on the discharge side of the compressor 121. In addition, refrigerant that flows into the heating medium—refrigerant heat exchanger 122 is compressed above its critical pressure by the compressor 121, so that the refrigerant in the supercritical state heats the heating medium in the heating medium—refrigerant heat exchanger 122.

<Air Supply Device>

The air supply device 103 is a device that supplies the outdoor air (shown as OA in FIG. 1) to a room in the building U, and, in the present embodiment, mainly includes a supply air outlet (not shown) that supplies the outdoor air from the outside to the room as the ventilation air, an exhaust air outlet (now shown) that exhausts the room air (shown as RA in FIG. 1) from the room to the outside, and an exhaust fan 131 which is provided to the exhaust air outlet and which exhausts a portion of the room air as the exhaust air (shown as EA in FIG. 1) from the room to the outside. The room can be ventilated by the operation of the exhaust fan 131. Note that, in the present embodiment, the exhaust fan 131 is used to ventilate the room, however, the room may be ventilated by, for example, providing a supply air fan to the supply air outlet, or by providing both the exhaust fan and the supply air fan to the supply air outlet.

<Humidifier>

The humidifier 182 is placed in the room for example, and is a water supply type humidifier that humidifies the ventilation air that is supplied to the room by the air supply device 103. In this embodiment, the humidifier 182 is a humidifier that includes a spray nozzle 182*a* for spraying water that is supplied to the ventilation air through a water supply pipe 181. The tap water and the like may be used as water that is supplied to the humidifier 182 through the water supply pipe 181. Note that any humidifier will suffice, as long as the humidifier causes water to directly contact with the ventilation air, so that an air washer may be used instead of a spray nozzle.

<Heating Medium Circuit>

The heating medium circuit 104 includes a radiator 141, a fan convector 142, and a floor heating device 143 as room heating devices that release the heat of the heating medium heated in the heating medium—refrigerant heat exchanger 122 into the room, an outdoor air heating heat exchanging device 144 that heats the ventilation air that is supplied to the room by the air supply device 103 with the heat of the heating medium heated in the heating medium—refrigerant heat exchanger 122, and a supply water heating device 191 that heats water that is supplied to the humidifier 182 through the water supply pipe 181. The heating medium circuit 104 is a circuit that circulates the heating medium between the radiator 141, the fan convector 142, the floor heating device 143, the outdoor air heating heat exchanging device 144 and the supply water heating device 191, and the heating medium—refrigerant heat exchanger 122.

The radiator 141 is placed in the room for example, and is a device that mainly releases the heat of the heating medium into the room by radiation heat transfer. In the present embodiment, the radiator 141 includes a radiator heat exchanger 141*a* through which the heating medium passes and exchanges its heat with surrounding room air (here, the room air that just has been heat-exchanged in the radiator heat exchanger 141*a* is referred to as SA1 shown in FIG. 1).

The fan convector 142 is placed in the room for example, and is a device that mainly releases the heat of the heating medium into the room by forced convection heat transfer. In the present embodiment, the fan convector 142 includes a convector heat exchanger 142*a* through which the heating medium passes and exchanges its heat with surrounding air, and a convector fan 142*b* which supplies the room air to the convector heat exchanger 142*a* and supplies the indoor air having been heat-exchanged in the convector heat exchanger 142*a* to the room as the supply air (shown as SA1' in FIG. 1).

The floor heating device 143 is placed under the floor of the building U for example, and is a device that mainly includes a floor heating pipe 143*a* that releases the heat of the heating medium into the room via a heat transfer panel provided on a floor surface.

The outdoor air heating heat exchanging device 144 is placed outside for example, and is a device that mainly includes an outdoor air heat exchanger 144*a* that heats the ventilation air that is supplied to the room by the air supply device 103 with the heat of the heating medium (here, the supply air that is supplied to the room after being heat-exchanged in the outdoor air heat exchanger 144*a* is referred to as SA3 shown in FIG. 1).

The supply water heating device 191 is placed outside, for example, and is a device that mainly includes a supply water heat exchanger 191*a* that heats water that is supplied to the humidifier 182 through the water supply pipe 181 with the heat of the heating medium.

In the present embodiment, the heating medium circuit 104 is connected to the heating medium—refrigerant heat exchanger 122 such that the heating medium heated in the heating medium—refrigerant heat exchanger 122 is sequentially supplied to the radiator heat exchanger 141*a* in the radiator 141, the convector heat exchanger 142*a* of the fan convector 142, the floor heating pipe 143*a* of the floor heating device 143, the outdoor air heat exchanger 144*a* of the outdoor air heating heat exchanging device 144, and then the supply water heat exchanger 191*a* of the supply water heating device 191. More specifically, the heating medium circuit 104 constitutes a single heating medium circuit connected in series such that the heating medium heated in the heating medium—refrigerant heat exchanger 122 by exchanging its heat with the refrigerant passes from a heating medium outlet of the heating medium—refrigerant heat exchanger 122 sequentially through the radiator heat exchanger 141*a*, the convector heat exchanger 142*a*, the floor heating pipe 143*a*, the outdoor air heat exchanger 144*a*, and then the supply water heat exchanger 191*a*, and returns to the heating medium inlet of the heating medium—refrigerant heat exchanger 122 by a heating medium circulating pump 145 connected to the heating medium outlet of the supply water heat exchanger 191a. In other words, the heating medium circuit 104 will be connected in order from the radiator heat exchanger 141a that requires the highest temperature heating medium to the supply water heat exchanger 191a that can use even the lowest temperature heating medium.

The heating medium circulating pump 145 is connected between the heating medium outlet of the supply water heat exchanger 191a and the heating medium inlet of the heating medium—refrigerant heat exchanger 122, and is a pump that is rotatably driven by a drive mechanism such as an electric motor so as to circulate the heating medium between the radiator heat exchanger 141a, the convector heat exchanger 142a, the floor heating pipe 143a, the outdoor air heat exchanger 144a and the supply water heat exchanger 191a, and the heating medium—refrigerant heat exchanger 122.

Here, as the heating medium that flows through the heating medium circuit 104, water and brine may be used. When water is used as the heating medium, it will be advantageous in that inexpensive devices and pipes can be used to constitute the heating medium circuit 104. In addition, when brine is used as the heating medium, it is preferable to use brine that does not freeze below 0 degrees C. even during the low outdoor air temperature period, in order to prevent the heating medium from freezing in the outdoor air heating heat exchanging device 144 (specifically, in the outdoor air heat exchanger 144a). This type of brine includes, for example, calcium chloride aqueous solution, sodium chloride aqueous solution, magnesium chloride aqueous solution, etc.

(2) Operation of the Air Conditioning System

Figure 2:
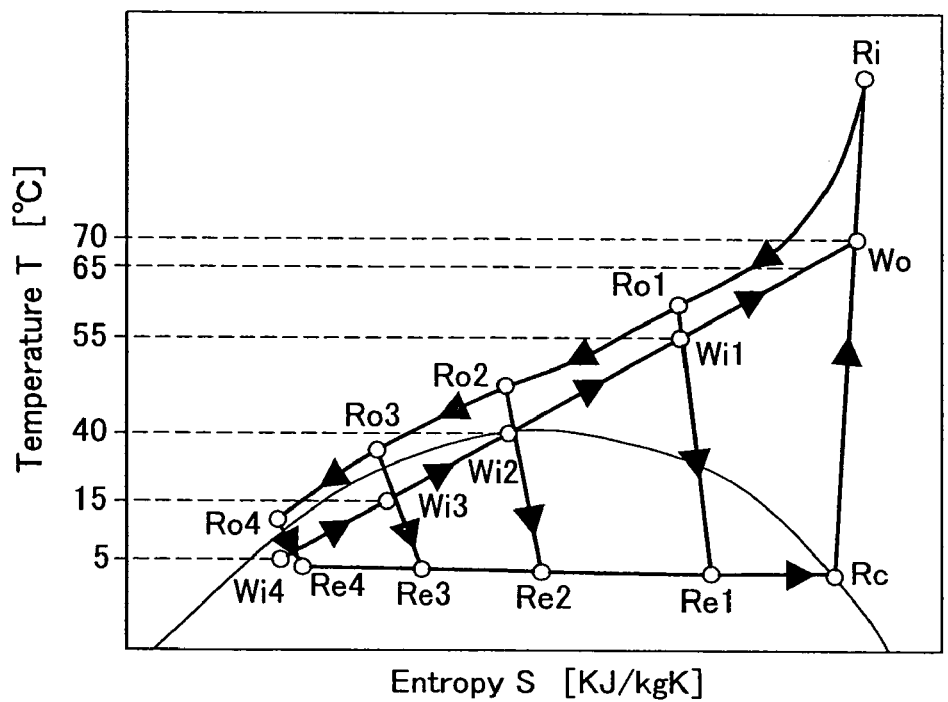
FIG. 2 is a temperature-entropy diagram of the operation of the air conditioning system.
Figure 3:
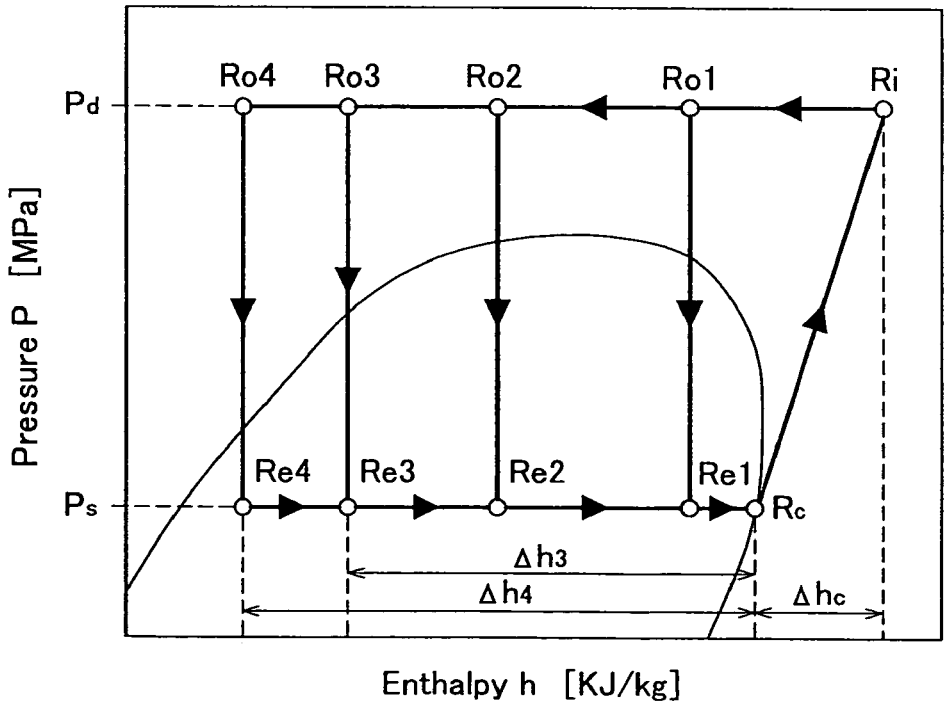
FIG. 3 is a pressure-enthalpy diagram of the operation of the air conditioning system.
Figure 4:
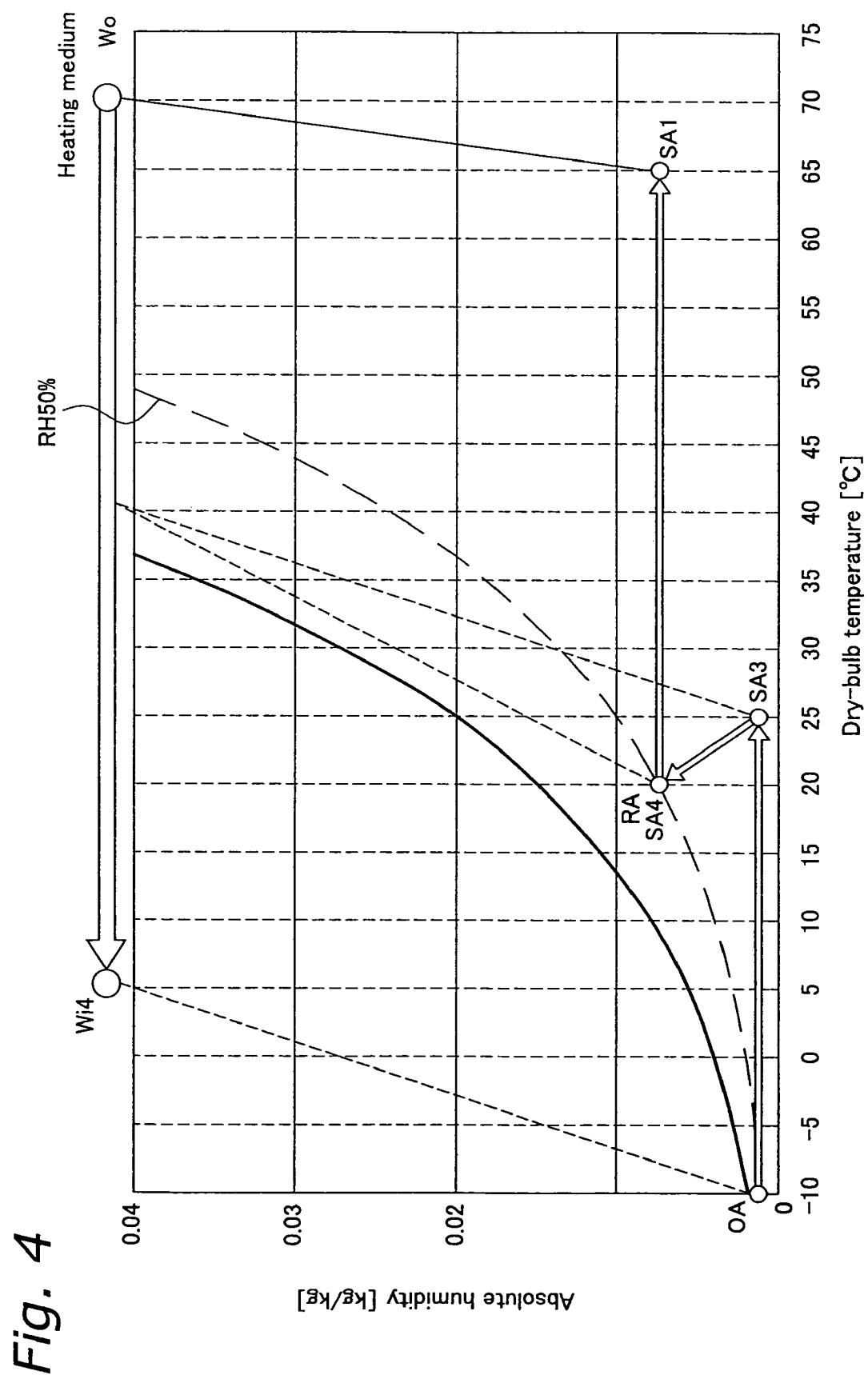
FIG. 4 is a psychrometric chart of the operation of the air conditioning system according to an embodiment of the present invention.

Next, the operation of the air conditioning system 101 of this embodiment will be described with reference to FIGS. 1 to 4. Here, FIG. 2 is a temperature-entropy diagram of the operation of the air conditioning system 101. FIG. 3 is a pressure-enthalpy diagram of the operation of the air conditioning system 101. FIG. 4 is a psychrometric chart of the operation of the air conditioning system 101.

First, the heating medium circulating pump 145 is started to circulate the heating medium in the heating medium circuit 104. Then, the compressor 121 of the heat source unit 102 will be started. Then, the low pressure refrigerant sucked into the compressor 121 (see dot Rc shown in FIGS. 1 to 3) will be compressed by the compressor 121 and discharged therefrom as the high temperature and high pressure refrigerant (see dot Ri shown in FIGS. 1 to 3). This high temperature and high pressure refrigerant will flow into the heating medium—refrigerant heat exchanger 122 and will heat the heating medium, and the refrigerant itself will be cooled and become a low temperature and high pressure refrigerant (see dot Ro4 shown in FIGS. 1 to 3). The refrigerant cooled in the heating medium—refrigerant heat exchanger 122 by heating the heating medium will be decompressed by the expansion mechanism 123 and become a low temperature and low pressure refrigerant in a vapor-liquid two-phase state (see dot Re4 in FIGS. 1 to 3). This refrigerant in a vapor-liquid two-phase state will be heated in the heat source side heat exchanger 124 by a heat source such as water or outdoor air, and will evaporate into a low temperature and low pressure gas refrigerant (see dot Rc in FIGS. 1 to 3). Then, this low temperature and low pressure gas refrigerant will be again sucked into the compressor 121.

Here, the heating medium that circulates in the heating medium circuit 104 flows into the heating medium—refrigerant heat exchanger 122 from the heating medium inlet (see dot Wi4 in FIGS. 1, 2, and 4), and will be heated in the heating medium—refrigerant heat exchanger 122 by exchanging its heat with the high temperature and high pressure refrigerant compressed in and discharged from the compressor 121 (see dot Wo shown in FIGS. 1, 2, and 4). Then, the high temperature heating medium heated in the heating medium—refrigerant heat exchanger 122 will flow into the radiator heat exchanger 141a of the radiator 141, release the heat of the heating medium into the room (specifically, the room air surrounding the radiator heat exchanger 141a will be heated), and the heating medium itself will be cooled and the temperature thereof will decrease (for example, the temperature will decrease from about 70 degrees C. to about 65 degrees C. as shown in FIG. 2). At this time, the room air (see RA shown in FIG. 4) will be heated in the radiator heat exchanger 141a to a state of dot SA1 shown in FIG. 4).

Next, the heating medium that flowed out from the radiator heat exchanger 141a will flow into the convector heat exchanger 142a of the fan convector 142, and release the heat of the heating medium into the room (specifically, the room air supplied by the convector fan 142b will be heated), and the heating medium itself will be cooled and the temperature thereof will decrease (for example, the temperature will decrease from about 65 degrees C. to about 55 degrees C. as shown in FIG. 2). At this time, the room air (see arrows RA shown in FIG. 1) becomes a supply air SA1' by the convector heat exchanger 142a (see FIG. 1) and will be supplied to the room.

Next, the heating medium that flowed out from the convector heat exchanger 142a will flow into the floor heating pipe 143a of the floor heating device 143, and release the heat of the heating medium into the room (specifically, a floor surface will be heated by the floor heating pipe 143a), and the heating medium itself will be cooled and the temperature thereof will decrease (for example, the temperature will decrease from about 55 degrees C. to about 40 degrees C. as shown in FIG. 2).

Next, the heating medium that flowed out from the floor heating pipe 143a will flow into the outdoor air heat exchanger 144a of the outdoor air heating heat exchanging device 144, and will heat ventilation air that is supplied to the room by the air supply device 103 with the heat of the heating medium. The heating medium itself will be cooled and the temperature thereof will be low (for example, the temperature will drop from about 40 degrees C. to about 15 degrees C. as shown in FIG. 2). At this time, the ventilation air (see dot OA shown in FIG. 4, about −10 degrees C.) will be heated to a state of dot SA3 shown in FIG. 4 (about 25 degrees C. in FIG. 4) by the outdoor air heat exchanger 144a.

Next, the heating medium that flowed out from the outdoor air heating heat exchanging device 144 flows into the supply water heat exchanger 191a of the supply water heating device 191 and heats water that is supplied to the humidifier 182 through the water supply pipe 181. The heating medium itself is cooled and the temperature thereof decreases (for example, the temperature decreases from about 15 degrees C. to about 5 degrees C. as shown in FIG. 2).

Then, the heating medium that flowed out from the supply water heat exchanger 191a again flows into the heating medium—refrigerant heat exchanger 122 through the heating medium circulating pump 145 (see dot Wi4 in FIGS. 1, 2, and 4).

On the other hand, the temperature of the room air RA is maintained at about 20 degrees C. (see dot RA shown in FIG. 4) by the heating operation using the radiator 141, the fan convector 142, and the floor heating device 143.

In this case, when the ventilation air (shown as SA3 in FIG. 1) heated in the outdoor air heating heat exchanging device 144 by exchanging heat with the heating medium is to be supplied to the room, the ventilation air is introduced into the humidifier 182, humidified with water sprayed from the spray nozzle 182a of the humidifier 182, and then supplied to the room (shown as SA4 in FIG. 1). Consequently, the air conditioning system 101 of this embodiment can humidify the ventilation air, so that even when the absolute humidity of the ventilation air is lower than the absolute humidity of the room air, it is possible to prevent the room from becoming dry due to the supply of ventilation air to the room.

Incidentally, due to evaporation of water sprayed from the spray nozzle 182a, the temperature of the ventilation air humidified by the humidifier 182 will be lower than the temperature of the ventilation air heated in the outdoor air heating heat exchanging device 144. However, in the air conditioning system 101 of this embodiment, the ventilation air (shown as SA3 in FIG. 4) is heated by the outdoor air heating heat exchanging device 144 to a temperature (to about 25 degrees C. in FIG. 4) higher than the temperature (about 20 degrees C. in FIG. 4) of the room air. In this way, even when the temperature of the ventilation air decreases due to evaporation of water in the humidifier 182, the temperature of the ventilation air (shown as SA4 in FIG. 4) that is supplied to the room will be close to the temperature (about 20 degrees C. in FIG. 4) of the room air (shown as RA in FIG. 4). Further, the absolute humidity of the ventilation air SA4 is also almost equal to the absolute humidity of the room air RA (in FIG. 4, it is equivalent to relative humidity 50%). Accordingly, in the air conditioning system 101 of this embodiment, the ventilation air having a low temperature and a low humidity compared to the room air is heated and humidified respectively by the outdoor air heating heat exchanging device 144 and the humidifier 182 so that the ventilation air is heated and humidified to the same temperature and humidity conditions of the room air, and after which the ventilation air can be supplied to the room. As a result, it is possible to enhance the comfort of the room.

(3) Characteristics of the Air Conditioning System

The air conditioning system 101 of this embodiment has the following characteristics.

(A)

Figure 5:
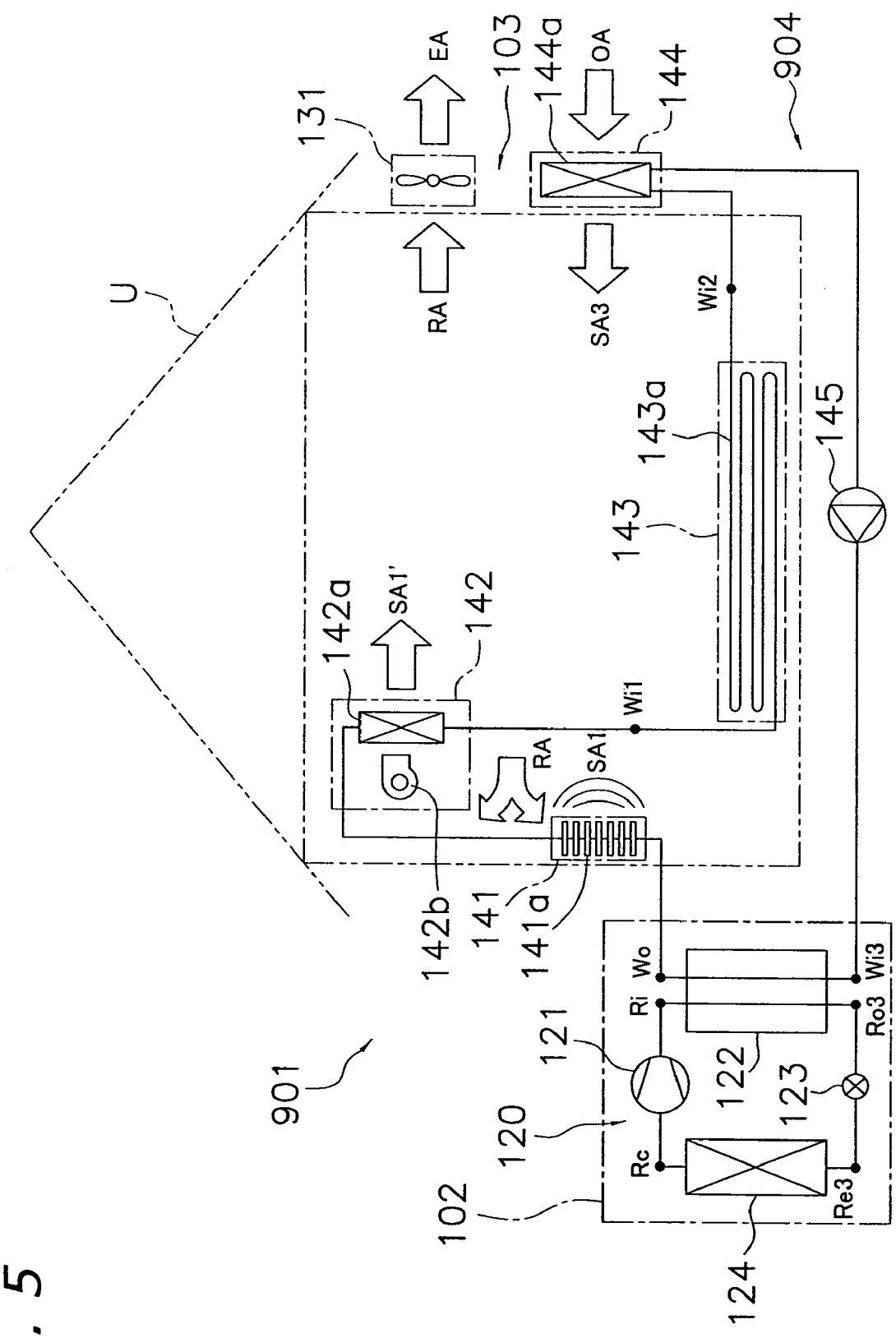
FIG. 5 is a schematic block diagram of an air conditioning system of a comparative example.
Figure 6:
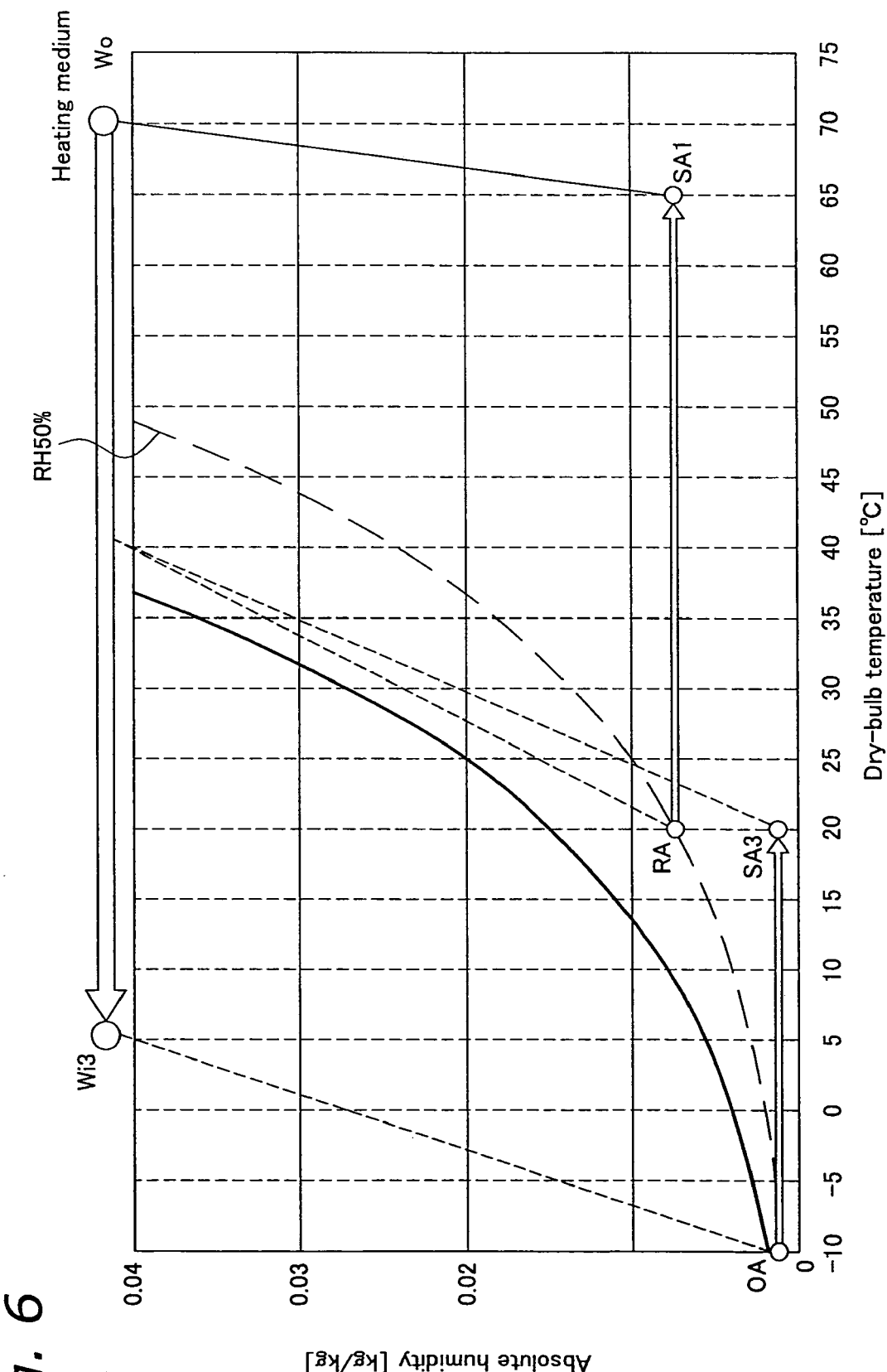
FIG. 6 is a psychrometric chart of the operation of the air conditioning system of a comparative example.

An air conditioning system 901 as shown in FIG. 5 may be provided as a comparative example of the air conditioning system 101 of this embodiment. The air conditioning system 901 of the comparative example comprises, as is the case with the air conditioning system 101, the heat source unit 102, the air supply device 103, and a heating medium circuit 904 having the radiator 141, the fan convector 142, the heating medium circulating pump 145, and the outdoor air heating heat exchanging device 144. This type of air conditioning system 901 does not include the humidifier 182, so that the ventilation air (shown as OA in FIG. 5) will be supplied to the room simply after being heated by the outdoor air heating heat exchanging device 144, when heating the room. Consequently, the temperature of the ventilation air (shown as SA3 in FIG. 6) will be about the same as the temperature (about 20 degrees C. in FIG. 6) of the room air (shown as RA in FIG. 6), and it is possible to prevent a cold draft due to the ventilation air that is supplied to the room for ventilation in the room. However, the absolute humidity of the ventilation air is extremely low compared to the absolute humidity of the room air (in FIG. 6, it is equivalent to relative humidity 50%), so that when the ventilation air is mixed with the room air in the room, the humidity of the room air will decrease.

However, the air conditioning system 101 of this embodiment comprises the supply water heating device 191 that heats water that is used in the water supply type humidifier 182, so that it is possible to efficiently humidify the ventilation air by using preheated water and supply this ventilation air to the room, when heating the room. Accordingly, it will be possible to prevent a decrease in the humidity in the room caused by the ventilation air that is supplied to the room for ventilation in the room, therefore enhancing the comfort of the room.

(B)

In the air conditioning system 901 of the comparative example, the heating medium circuit 904 does not include the supply water heating device 191. Therefore, as shown in FIGS. 2, 3, and 5, the heating medium heated by exchanging its heat with the refrigerant in the heating medium—refrigerant heat exchanger 122 will change from a state of dot Wo to a state of dots Wi3, and the heating medium will circulate in the heating medium circuit 904 so as to be returned to the heating medium—refrigerant heat exchanger 122. Along with this, as shown in FIGS. 2 and 3, the refrigerant will circulate in the refrigerant circuit 120 such that the refrigerant changes in order from a state of dot Rc on a suction side of the compressor 121 to a state of dot Ri that corresponds to dot Wo, to a state of dot Ro3 that corresponds to dot Wi3, and then to a state of dot Re3, and again is sucked into the compressor 121. Here, as shown in FIG. 3, the COP (based on the evaporation side) of the heat source unit 102 of the air conditioning system 901 of the comparative example is a value obtained by dividing the enthalpy difference Δh3 on the evaporation side in the freezing cycle of dot Rc-->dot Ri-->dot Ro3-->dot Re3-->dot Rc by the enthalpy difference Δhc that corresponds to the power consumption of the compressor 121 (=Δh3/Δhc).

On the other hand, in air conditioning system 101 of this embodiment, the supply water heating device 191 is connected to the heating medium circuit 104, and the heating medium circuit 104 is connected to the heating medium—refrigerant heat exchanger 122 such that the heating medium heated in the heating medium—refrigerant heat exchanger 122 is supplied to the supply water heating device 191 after being used in the radiator 141, the fan convector 142, the floor heating device 143, and the outdoor air heating heat exchanging device 144, so that the heating medium heated in the heating medium—refrigerant heat exchanger 122 by exchanging heat with the refrigerant will circulate in the heating medium circuit 104 such that the heating medium changes from a state of dot Wo to a state of dot Wi4 and again is returned to the heating medium—refrigerant heat exchanger 122, as shown in FIGS. 1, 2, and 3. Along with this, as shown in FIGS. 2 and 3, the refrigerant will circulate in the refrigerant circuit 120 such that the refrigerant changes in order from a state of dot Rc on the suction side of the compressor 121 to a state of dot Ri that corresponds to dot Wo, to a state of dot Ro4 that corresponds to dot Wi4, and then to a state of Re4, and again is sucked into the compressor 121. Accordingly, the radiator 141, the fan convector 142, and the floor heating device 143 can use the heat of a high temperature heating medium that just has been heated in heating medium—refrigerant heat exchanger 122, and the outdoor air heating heat exchanging device 144 can use the heat of the heating medium cooled by releasing its heat into the room in the radiator 141, the fan convector 142, and the floor heating device 143 (see dot Wi2 in FIGS. 1 and 2). Further, the supply water heating device 191 can use the heat of the heating medium cooled by releasing its heat into the room in the outdoor air heating heat exchanging device 144 (see dot Wi3 shown in FIGS. 1 and 2). Here, for example, when the tap water is used as water to be used in the humidifier 182, the temperature of the tap water is lower than that of the room air (shown as RA in FIG. 1), and so the tap water may be heated in the supply water heating device 191 by using the heating medium cooled by releasing its heat into the room in the radiator 141, the fan convector 142, the floor heating device 143, and the outdoor air heating heat exchanging device 144. Then, the heating medium used in the supply water heating device 191 to heat water to be used in the humidifier 182 is further cooled by heating water (see dot Wi4 in FIGS. 1 and 2), and then returned to the heating medium—refrigerant heat exchanger 122. In this way, in this air conditioning system 101, the heating medium cooled by releasing its heat in the radiator 141, the fan convector 142, the floor heating device 143 and the outdoor air heating heat exchanging device 144 is supplied to the supply water heating device 191 in order to heat water to be used in the humidifier 182. Consequently, it is possible to increase the temperature difference between the inlet and the outlet of the heating medium—refrigerant heat exchanger 122 (in other words, the difference between the temperature of the heating medium in a state of dot Wo and the temperature of the heating medium in a state of dot Wi4), compared to the air conditioning system 901 of the comparative example. Accordingly, as shown in FIG. 3, the COP (based on the evaporation side) of the heat source unit 102 in the air conditioning system 101 of this embodiment is a value obtained by dividing the enthalpy difference $\Delta h4$ on the evaporation side in the refrigerating cycle of dot Rc-->dot Ri-->dot Ro4-->dot Re4-->dot Rc by the enthalpy difference $\Delta hc$ that corresponds to the power consumption of the compressor 121 ($=\Delta h4/\Delta hc$). Accordingly, the COP is improved compared to the air conditioning system 901 that does not comprise the supply water heating device 191 of the comparative example. Note that in the air conditioning system 901 of the comparative example, an air conditioning system that does not include the outdoor air heating heat exchanging device 144 may be conceivable, however, also in such a case, it is possible to improve the COP by providing the supply water heating device 191.

(C)

The air conditioning system 101 of this embodiment uses $CO_2$ as the refrigerant that flows through the vapor compression type refrigerant circuit 120 of the heat source unit 102. Accordingly, the refrigerant temperature on the discharge side of the compressor 121 can be increased, and the temperature level that can be used in the radiator 141, the fan convector 142, the floor heating device 143, the outdoor air heating heat exchanging device 144, and the supply water heating device 191 can be increased. This will achieve comfortable room heating.

(4) Modified Example 1

In the above described air conditioning system 101, the supply water heating device 191 is connected to the heating medium circuit 104 such that the heating medium whose temperature is the lowest as a result of releasing its heat in the radiator 141, the fan convector 142, the floor heating device 143 and the outdoor air heating heat exchanging device 144 is supplied, however, the supply water heating device 191 may be connected to the heating medium circuit 104 such that a high temperature heating medium that just has been heated in the heating medium—refrigerant heat exchanger 122 is supplied.

Figure 7:
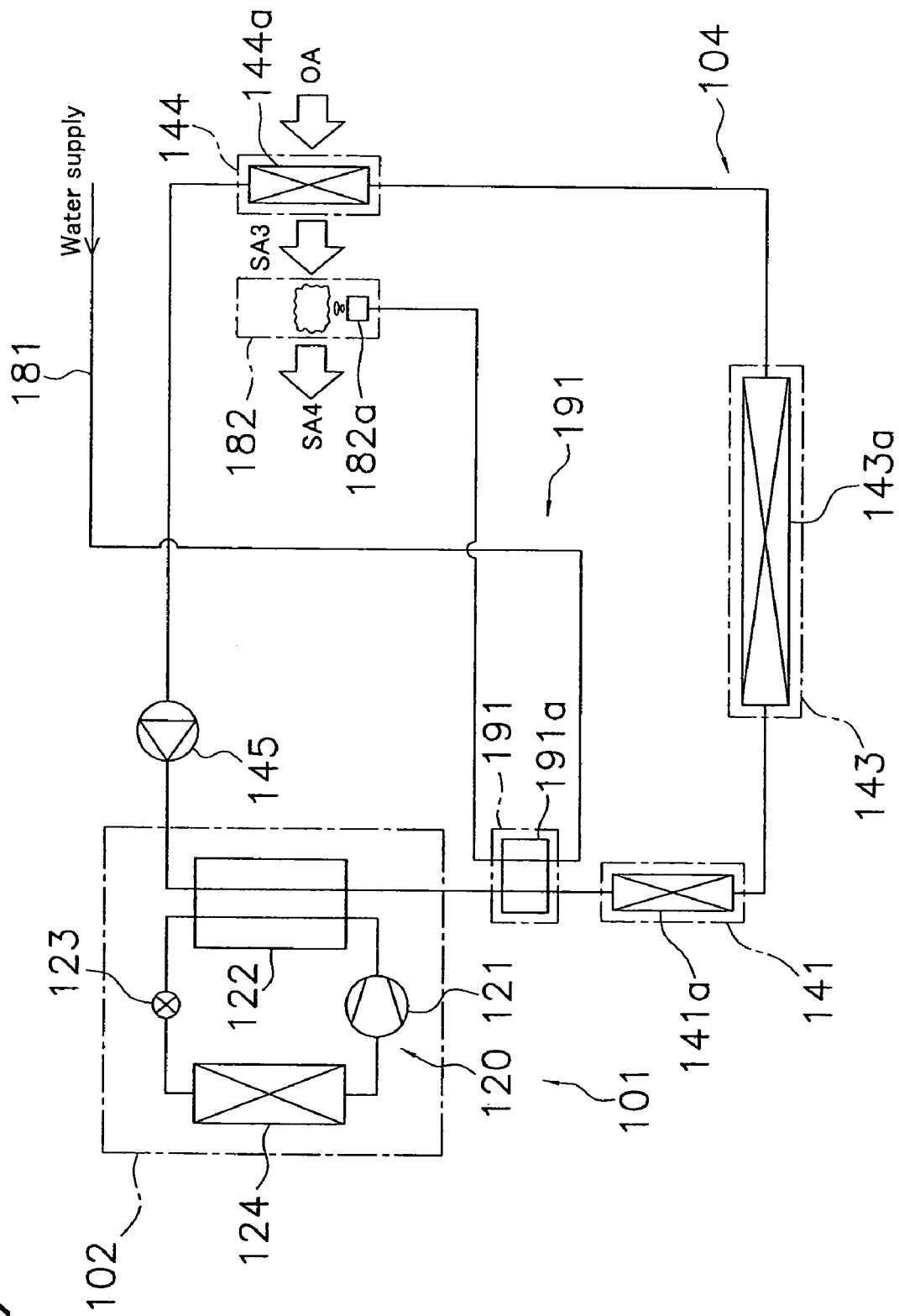
FIG. 7 is a schematic block diagram of an air conditioning system according to a modified example 1 of the present invention.

For example, in the air conditioning system 101 that does not include the fan convector 142 as shown in FIG. 7, the heating medium circuit 104 may be connected to the heating medium—refrigerant heat exchanger 122 such that the heating medium heated in the heating medium—refrigerant heat exchanger 122 is first supplied to the supply water heating device 191, and then supplied to the radiator 141, the floor heating device 143, and the outdoor air heating heat exchanging device 144. Accordingly, the supply water heating device 191 can use the heat of a high temperature heating medium that just has been heated in the heating medium—refrigerant heat exchanger 122, and the radiator 141, the floor heating device 143, and the outdoor air heating heat exchanging device 144 can use the heat of the heating medium cooled by releasing its heat into the water by the supply water heating device 191. Here, in order to efficiently humidify the ventilation air in the humidifier 182, it is desirable that water is heated to as high a temperature as possible. For example, when the tap water whose temperature is lower than that of the room air is used as water to be used in the humidifier 182, this tap water may be heated in the supply water heating device 191 to a high temperature by using the heat of a high temperature heating medium that just has been heated in the heating medium—refrigerant heat exchanger 122. The heating medium used in the supply water heating device 191 to heat water to be used in the humidifier 182 is cooled by heating water, used in the radiator 141, the floor heating device 143, and the outdoor air heating heat exchanging device 144, and then returned to the heating medium—refrigerant heat exchanger 122. In this way, in this air conditioning system 101, a high temperature heating medium that just has been heated in the heating medium—refrigerant heat exchanger 122 is supplied to the supply water heating device 191 in order to heat water to be used in the humidifier 182. Consequently, it will be possible to increase the temperature difference between the inlet and the outlet of the heating medium—refrigerant heat exchanger 122, therefore improving the COP of the heat source unit.

In addition, it is possible to use both the heat of the heating medium whose temperature is the lowest as a result of releasing its heat in the radiator 141, the fan convector 142, the floor heating device 143, and the outdoor air heating heat exchanging device 144, and the heat of a high temperature heating medium that just has been heated in the heating medium—refrigerant heat exchanger 122.

Figure 8:
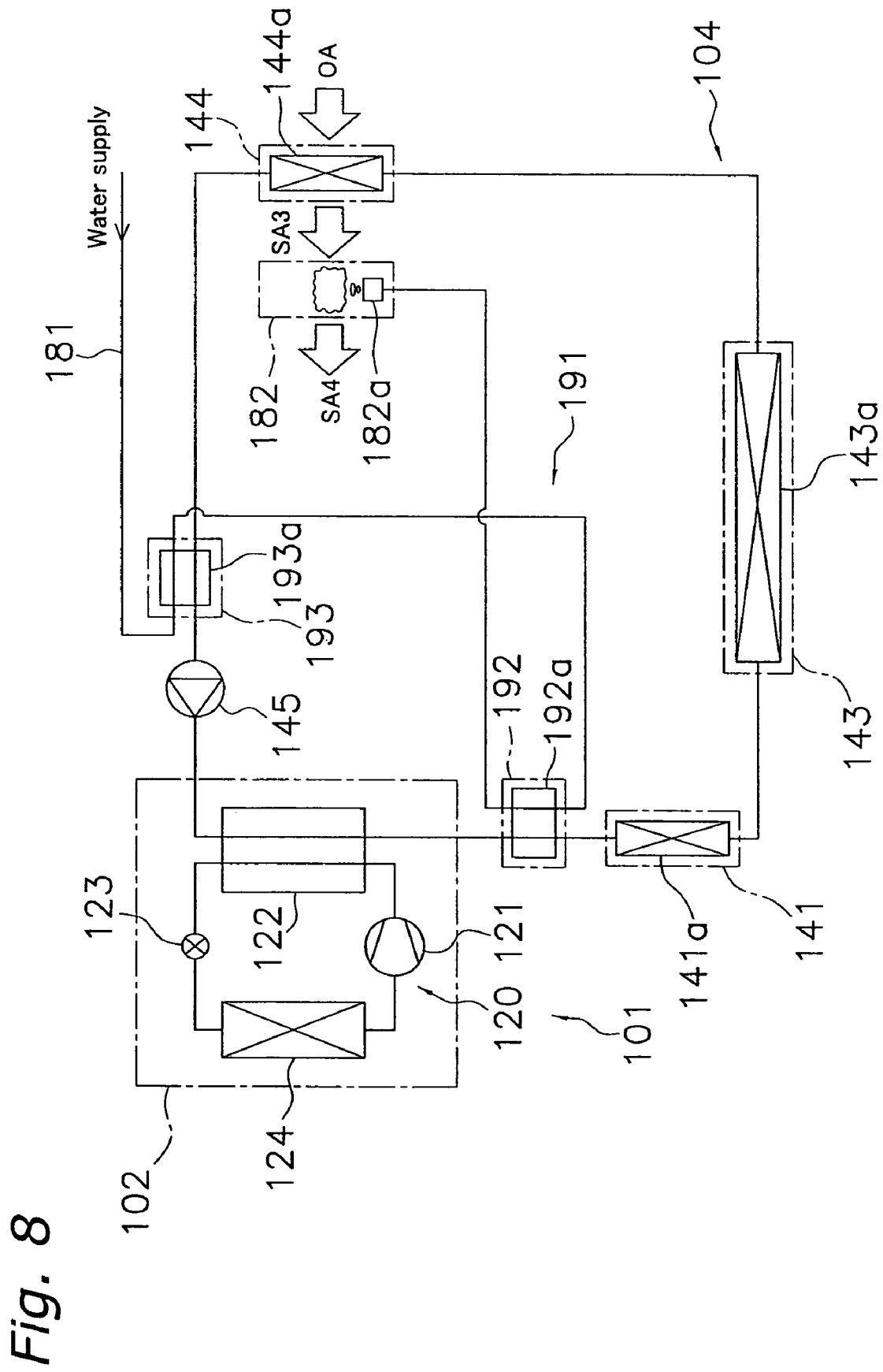
FIG. 8 is a schematic block diagram of an air conditioning system according to the modified example 1 of the present invention.

For example, in the air conditioning system 101 that does not include the fan convector 142 as shown in FIG. 8, the heating medium circuit 104 may be connected to the heating medium—refrigerant heat exchanger 122 such that the heating medium heated in the heating medium—refrigerant heat exchanger 122 is sequentially supplied to a first supply water heating device 192, the radiator 141, the floor heating device 143, the outdoor air heating heat exchanging device 144, and a second supply water heating device 193. Accordingly, the first supply water heating device 192 can use the heat of a high temperature heating medium that just has been heated in heating medium—refrigerant heat exchanger 122; the radiator 141, the floor heating device 143 and the outdoor air heating heat exchanging device 144 can use the heat of the heating medium cooled by releasing its heat into the room in the first supply water heating device 192; and the second supply water heating device 193 can use the heat of the heating medium cooled by releasing its heat into the room in the radiator 141, the floor heating device 143, and the outdoor air heating heat exchanging device 144. Here, for example, when the tap water is used as water to be used in the humidifier 182, the temperature of the tap water is lower than that of the room air, and so the tap water may be heated in the second supply water heating device 193 by using the heating medium cooled by releasing its heat into the room in the radiator 141, the floor heating device 143, and the outdoor air heating heat exchanging device 144. Further, in order to efficiently humidify the ventilation air in the humidifier 182, it is desirable that water is heated to as high a temperature as possible.

Therefore, the tap water may be heated in the first supply water heating device 192 to a high temperature by using the heat of a high temperature heating medium that just has been heated in the heating medium—refrigerant heat exchanger 122. The heating medium used in the first supply water heating device 192 to heat water to be used in the humidifier 182 is cooled by heating water to be used in the humidifier 182, cooled by being used in the radiator 141, the floor heating device 143, and the outdoor air heating heat exchanging device 144, further cooled by being used in the second supply water heating device 193 to heat water to be used in the humidifier 182, and then returned the heating medium—refrigerant heat exchanger 122. In this way, in this air conditioning system 101, by comprising the first and second supply water heating devices 192, 193, the heat of the heating medium that just has been heated in heating medium—refrigerant heat exchanger 122, and the heat of the heating medium cooled by being used in the radiator 141, the floor heating device 143, and the outdoor air heating heat exchanging device 144 are used in order to heat water to be used in the humidifier 182. Consequently, the temperature difference between the inlet and the outlet of the heating medium—refrigerant heat exchanger 122 can be increased, therefore improving the COP of the heat source unit.

(5) Modified Example 2

In the above described air conditioning system 101, the supply water heating device 191 (or the first and second supply water heating devices 192, 193, when two heat exchangers are disposed) is connected to the heating medium circuit 104 and configured so as to heat water to be supplied to the humidifier 182 with the heat of the heating medium. However, the supply water heating device 191 (or the first and second supply water heating devices 192, 193, when two heat exchangers are disposed) may be connected to the refrigerant circuit 120.

Figure 9:
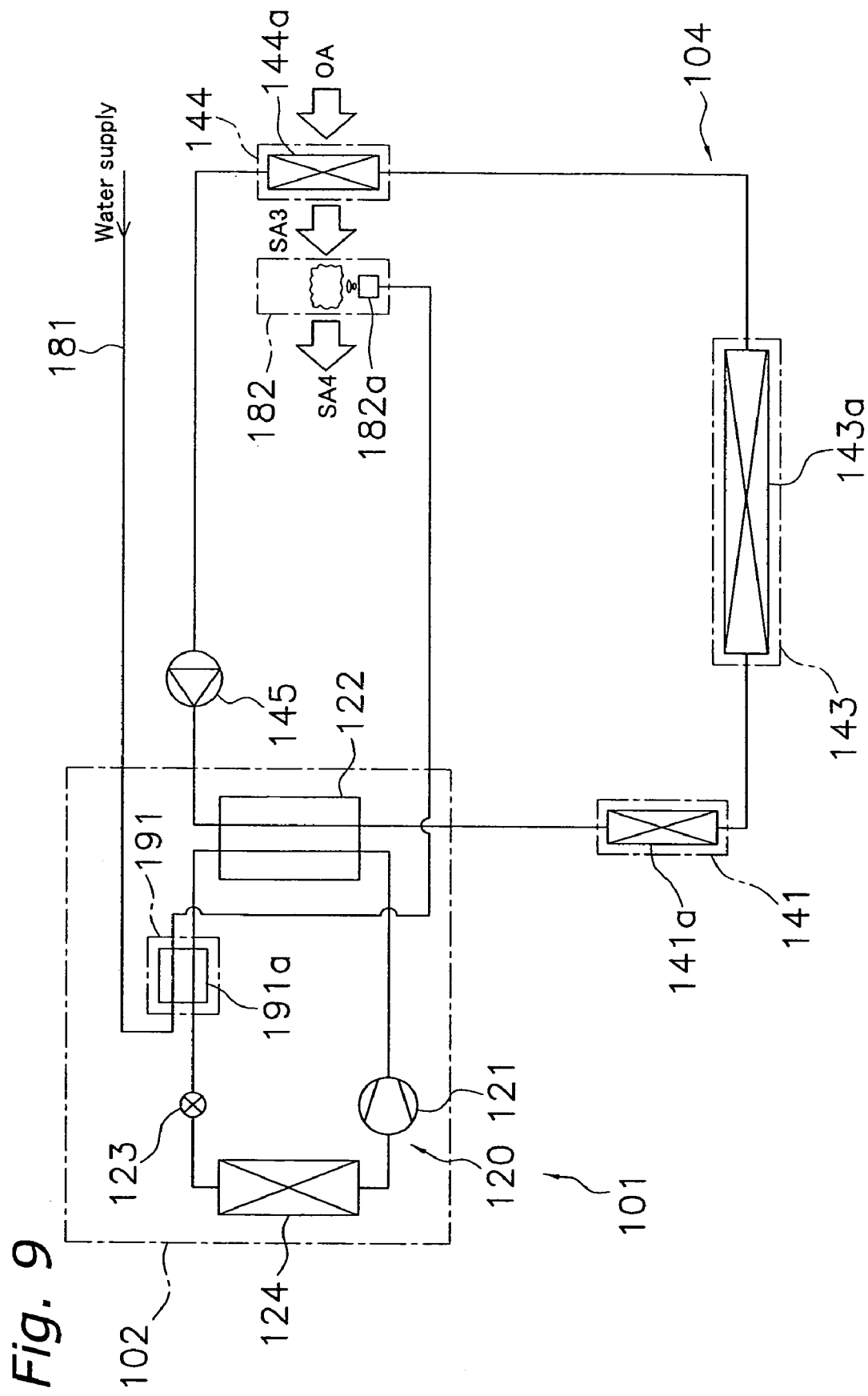
FIG. 9 is a schematic block diagram of an air conditioning system according to a modified example 2 of the present invention.

For example, in the air conditioning system 101 that does not include the fan convector 142 as show in FIG. 9, the supply water heating device 191 may be connected to the refrigerant circuit 120 such that the refrigerant sent from the heating medium—refrigerant heat exchanger 122 to the expansion mechanism 123 is supplied. Also in this case, as in the air conditioning system 101 shown in FIG. 1, the radiator 141, the floor heating device 143, and the outdoor air heating heat exchanging device 144 can use the heat of a high temperature heating medium that just has been heated in heating medium—refrigerant heat exchanger 122, and the supply water heating device 191 can use the heat of the refrigerant cooled in the heating medium—refrigerant heat exchanger 122 by heating the heating medium that is sent to the radiator 141, the floor heating device 143, and the outdoor air heating heat exchanging device 144.

Figure 10:
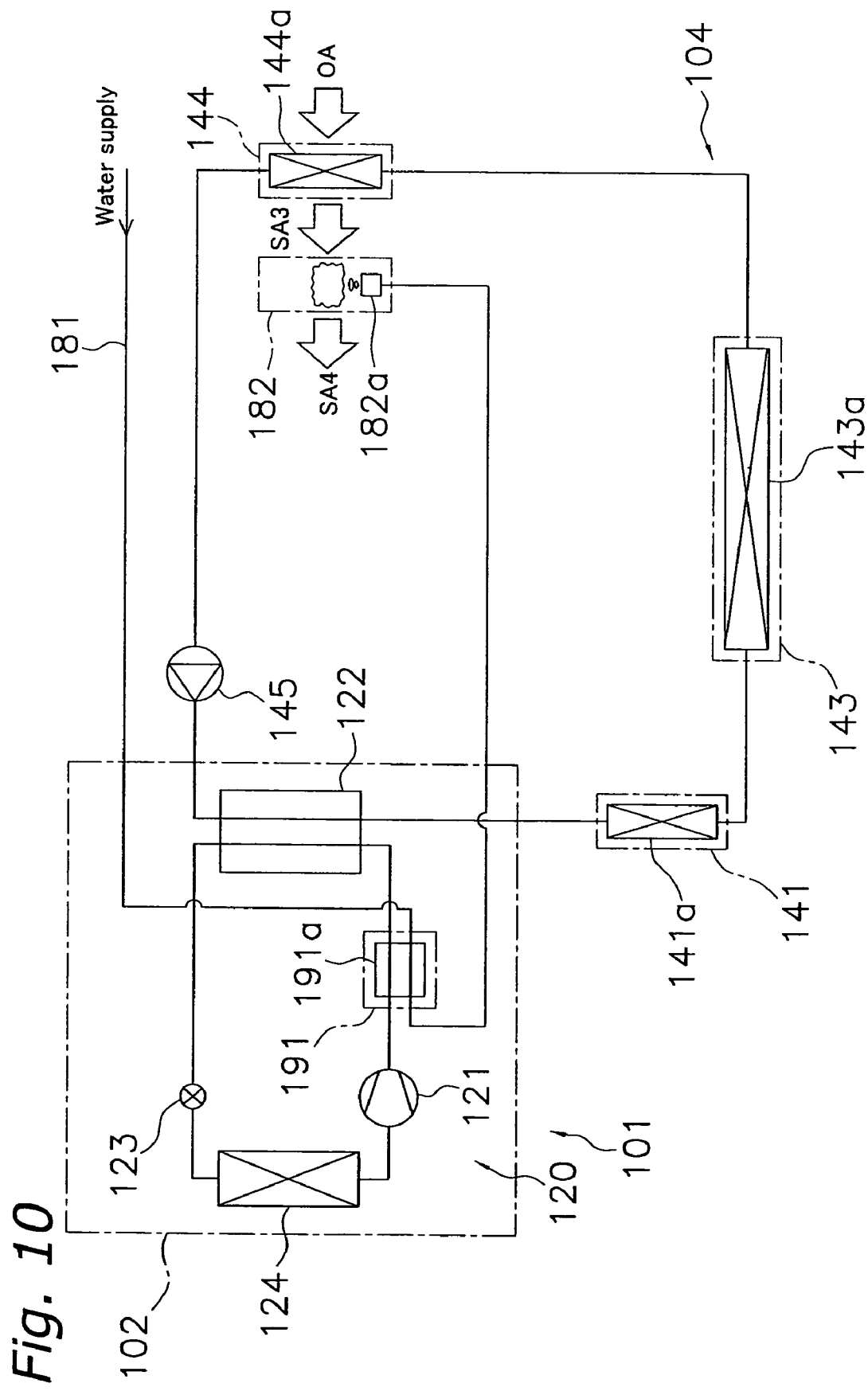
FIG. 10 is a schematic block diagram of an air conditioning system according to the modified example 2 of the present invention.

In addition, in the air conditioning system 101 that does not include the fan convector 142 as shown in FIG. 10, the supply water heating device 191 may be connected to the refrigerant circuit 120 such that the refrigerant sent from the compressor 121 to the heating medium—refrigerant heat exchanger 122 is supplied. Also in this case, as in the air conditioning system 101 shown in FIG. 7, the supply water heating device 191 can use the heat of the high temperature refrigerant that just has been compressed in and discharged from the compressor 121, and the radiator 141, the floor heating device 143, and the outdoor air heating heat exchanging device 144 can use the heat of the heating medium heated in the supply water heating device 191 by the refrigerant cooled by heating water.

Figure 11:
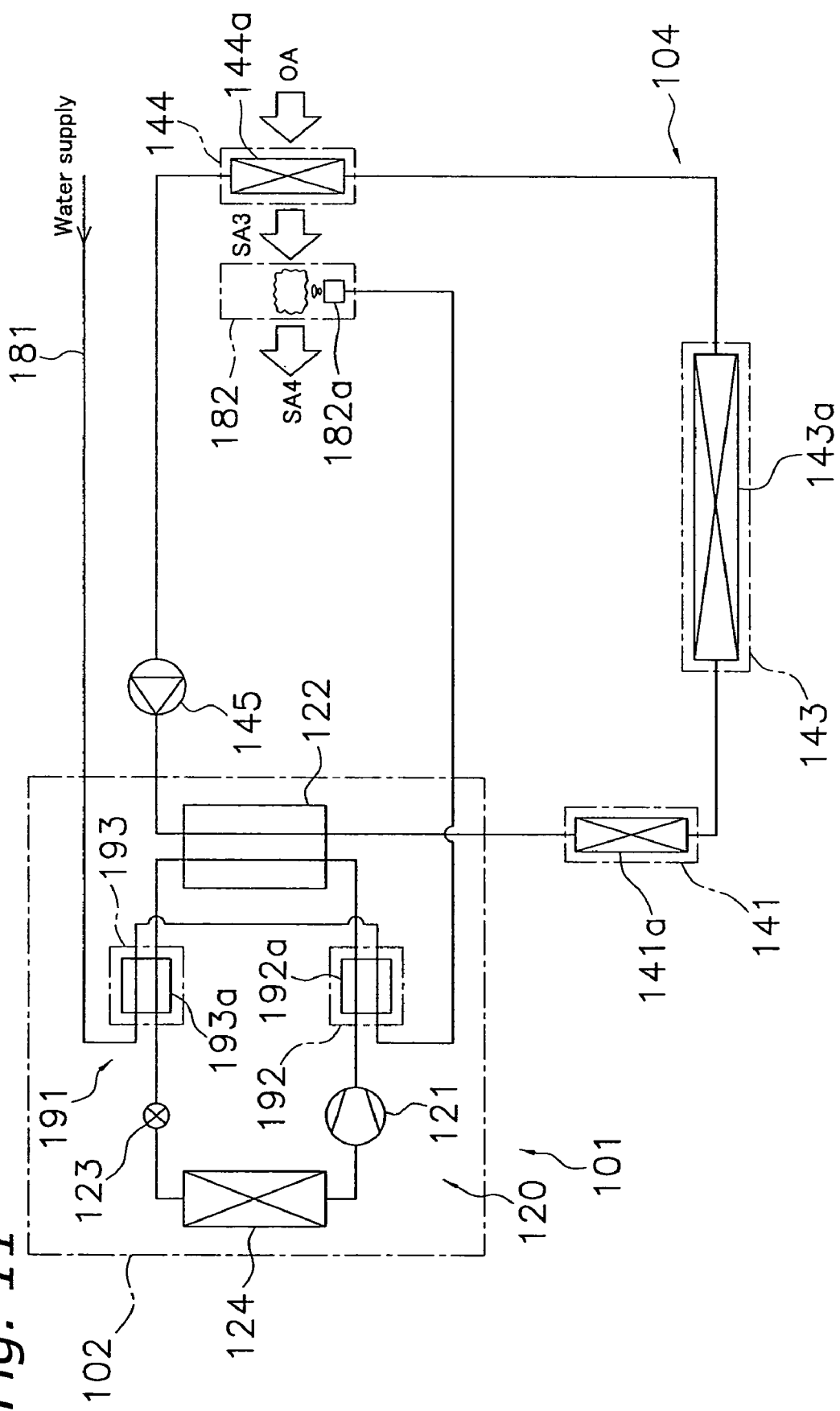
FIG. 11 is a schematic block diagram of an air conditioning system according to the modified example 2 of the present invention.

Further, in the air conditioning system 101 that does not include the fan convector 142 as shown in FIG. 11, the first supply water heating device 192 may be connected to the refrigerant circuit 120 such that the refrigerant sent from the compressor 121 to the heating medium—refrigerant heat exchanger 122 is supplied, and the second supply water heating device 193 may be connected to the refrigerant circuit 120 such that the refrigerant sent from the heating medium—refrigerant heat exchanger 122 to the expansion mechanism 123 is supplied. Also in this case, the first supply water heating device 192 can use the heat of the high temperature refrigerant that just as been compressed in and discharged from the compressor 121; the radiator 141, the floor heating device 143, and the outdoor air heating heat exchanging device 144 can use the heat of the heating medium heated in the first supply water heating device 192 by the refrigerant cooled by being used to heat water; and the second supply water heating device 193 can use the heat of the refrigerant cooled by heating the heating medium that is sent to the radiator 141, the floor heating device 143, and the outdoor air heating heat exchanging device 144.

Also in these air conditioning systems, by comprising the supply water heating device 191 (or the first and second supply water heating devices 192, 193, when two heat exchangers are disposed), the heat of the high temperature refrigerant that just has been compressed in and discharged from the compressor 121, and the heat of the refrigerant cooled by being used to heat the heating medium that is sent to the radiator 141, the floor heating device 143, and the outdoor air heating heat exchanging device 144 are used in order to heat water to be used in the humidifier 182. Consequently, it will be possible to increase the temperature difference between the inlet and the outlet of the heating medium—refrigerant heat exchanger 122, therefore improving the COP of the heat source unit 102.

(6) Modified Example 3

A description was given of the configuration of the air conditioning system 101 shown in FIGS. 8 and 11 of the above described modified examples 1 and 2 in which both the first and second supply water heating devices 192, 193 are connected to either one of the heating medium circuit 104 and the refrigerant circuit 120. However, it is not limited thereto, and either one of the first and second supply water heating devices 192, 193 may be connected to the heating medium circuit 104, and the other one may be connected to the refrigerant circuit 120.

Figure 12:
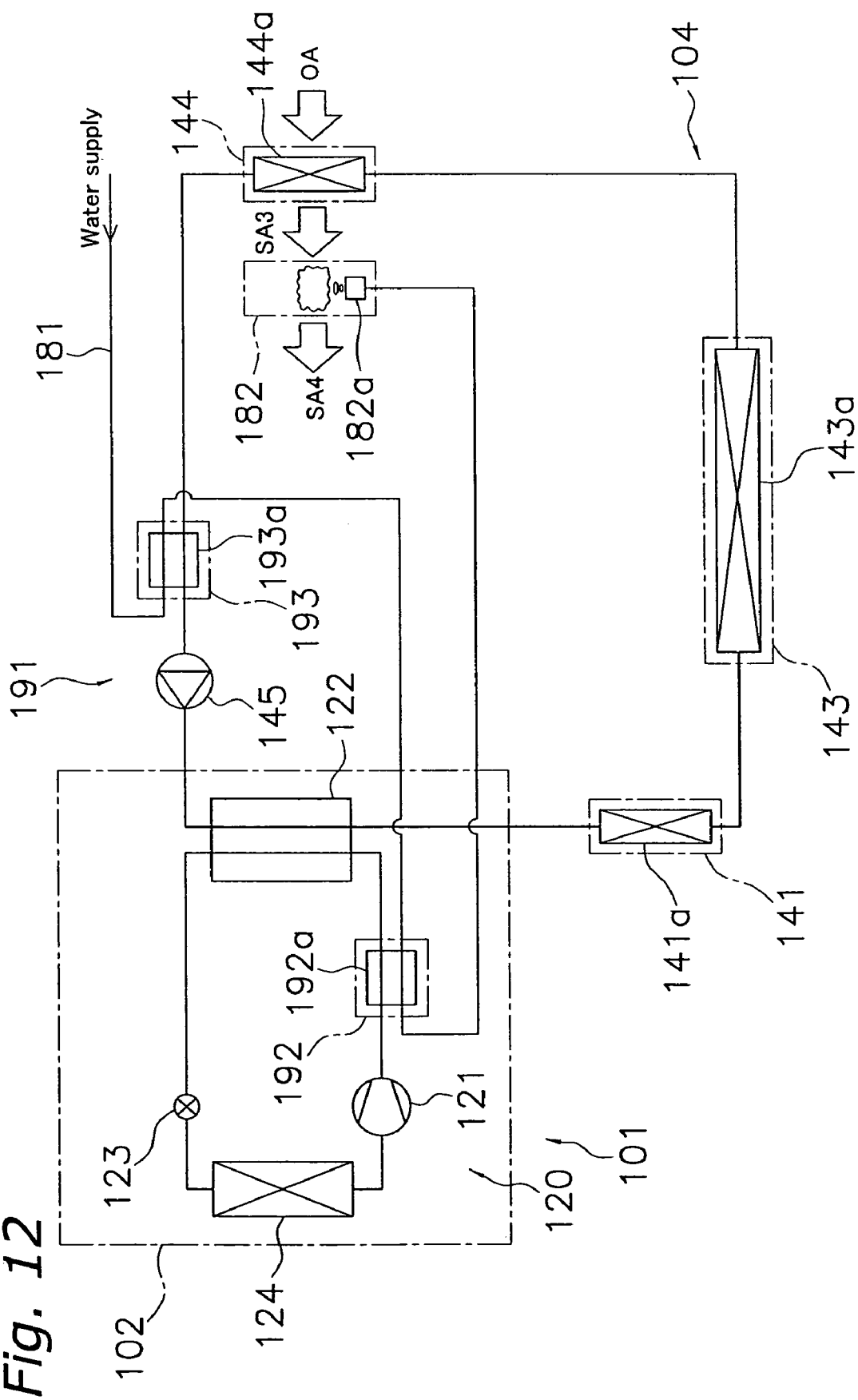
FIG. 12 is a schematic block diagram of an air conditioning system according to a modified example 3 of the present invention.

For example, in the air conditioning system 101 that does not include the fan convector 142 as shown in FIG. 12, the first supply water heating device 192 may be connected to the refrigerant circuit 120 such that the refrigerant sent from the compressor 121 to the heating medium—refrigerant heat exchanger 122 is supplied; the second supply water heating device 193 may be connected to the heating medium circuit 104; and the heating medium circuit 104 may be connected to the heating medium—refrigerant heat exchanger 122 such that the heating medium heated in the heating medium—refrigerant heat exchanger 122 is sequentially supplied to the radiator 141, the floor heating device 143, the outdoor air heating heat exchanging device 144, and the second supply water heating device 193. Even in this case, the first supply water heating device 192 can use the heat of the high temperature refrigerant that just has been compressed in and discharged from the compressor 121; the radiator 141, the floor heating device 143, and the outdoor air heating heat exchanging device 144 can use the heat of the heating medium heated in the first supply water heating device 192 by the refrigerant cooled by being used to heat water; and the second supply water heating device 193 can use the heat of the heating medium used in the radiator 141, the floor heating device 143, and the outdoor air heating heat exchanging device 144.

Figure 13:
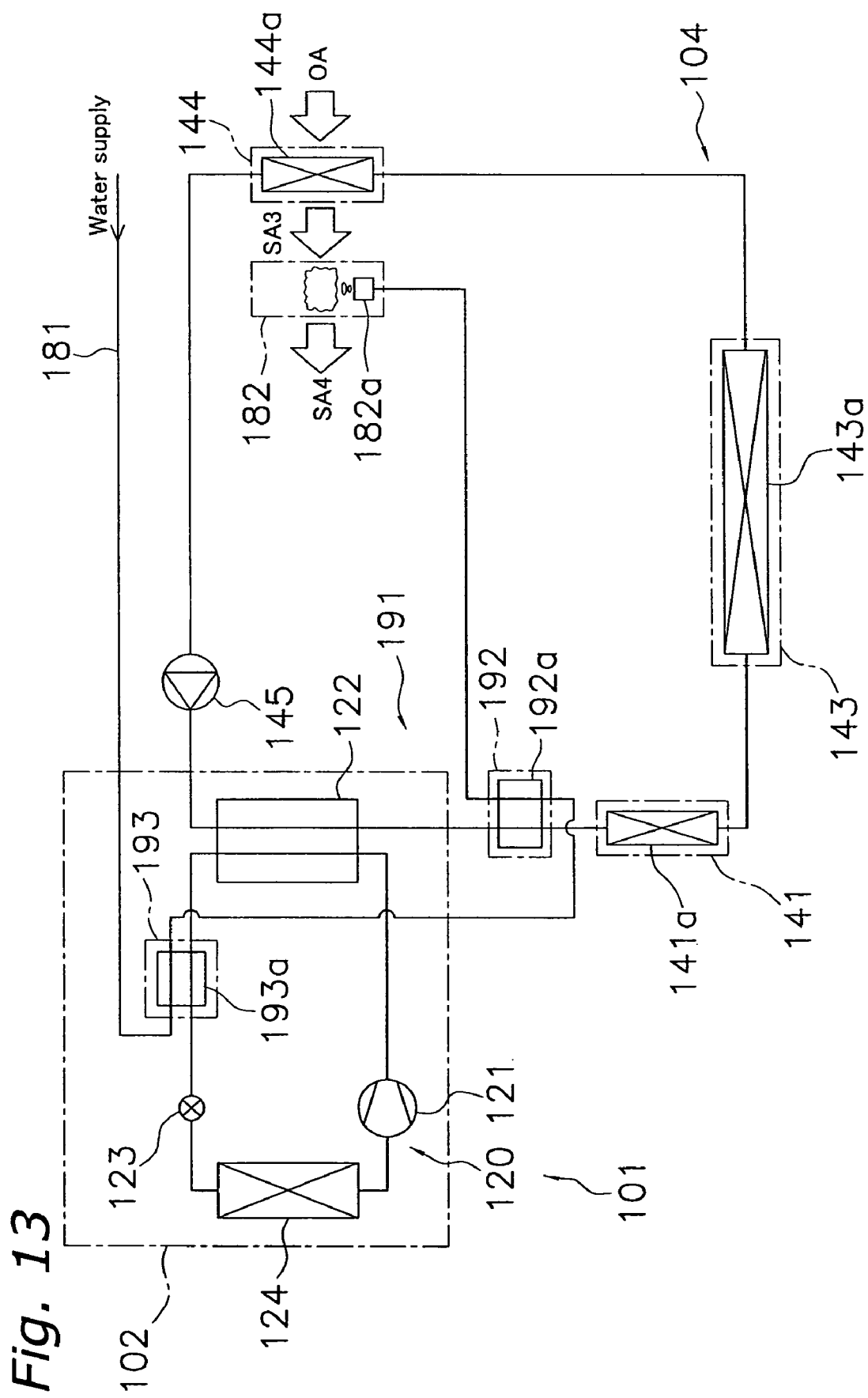
FIG. 13 is a schematic block diagram of an air conditioning system according to the modified example 3 of the present invention.

In addition, in the air conditioning system 101 that does not include the fan convector 142 as shown in FIG. 13, the first supply water heating device 192 may be connected to the heating medium circuit 104; the heating medium circuit 104 may be connected to the heating medium—refrigerant heat exchanger 122 such that the heating medium heated in the heating medium—refrigerant heat exchanger 122 is sequentially supplied to the first supply water heating device 192, the radiator 141, the floor heating device 143, and the outdoor air heating heat exchanging device 144; and the second supply water heating device 193 may be connected to the refrigerant circuit 120 such that the refrigerant sent from the heating medium—refrigerant heat exchanger 122 to the expansion mechanism 123 is supplied. Even in this case, the first supply water heating device 192 can use the heat of a high temperature heating medium that just has been heated in heating medium—refrigerant heat exchanger 122; the radiator 141, floor heating device 143 and the outdoor air heating heat exchanging device 144 can use the heat of the heating medium cooled by releasing its heat into the room in the first supply water heating device 192; and the second supply water heating device 193 can use the heat of the refrigerant cooled by heating the heating medium that is sent to the first supply water heating device 192, the radiator 141, the floor heating device 143, and the outdoor air heating heat exchanging device 144.

Also in these air conditioning systems, by comprising the first and second supply water heating devices 192, 193, the heat of the heating medium that just has been compressed in and discharged from the compressor 121, and the heat of the heating medium cooled by being used in the radiator 141, the floor heating device 143, and the outdoor air heating heat exchanging device 144 are used in order to heat water to be used in the humidifier 182. Consequently, it will be possible to increase the temperature difference between the inlet and the outlet of the heating medium—refrigerant heat exchanger 122, therefore improving the COP of the heat source unit 102.

(7) Modified Example 4

In the air conditioning system 101 of the above described embodiments and the modified examples, the humidifier 182 that uses a spray nozzle or an air washer is used as a humidifier for humidifying the ventilation air. However, it is not limited thereto, and a moisture permeable film having a moisture permeability may be used.

Figure 14:
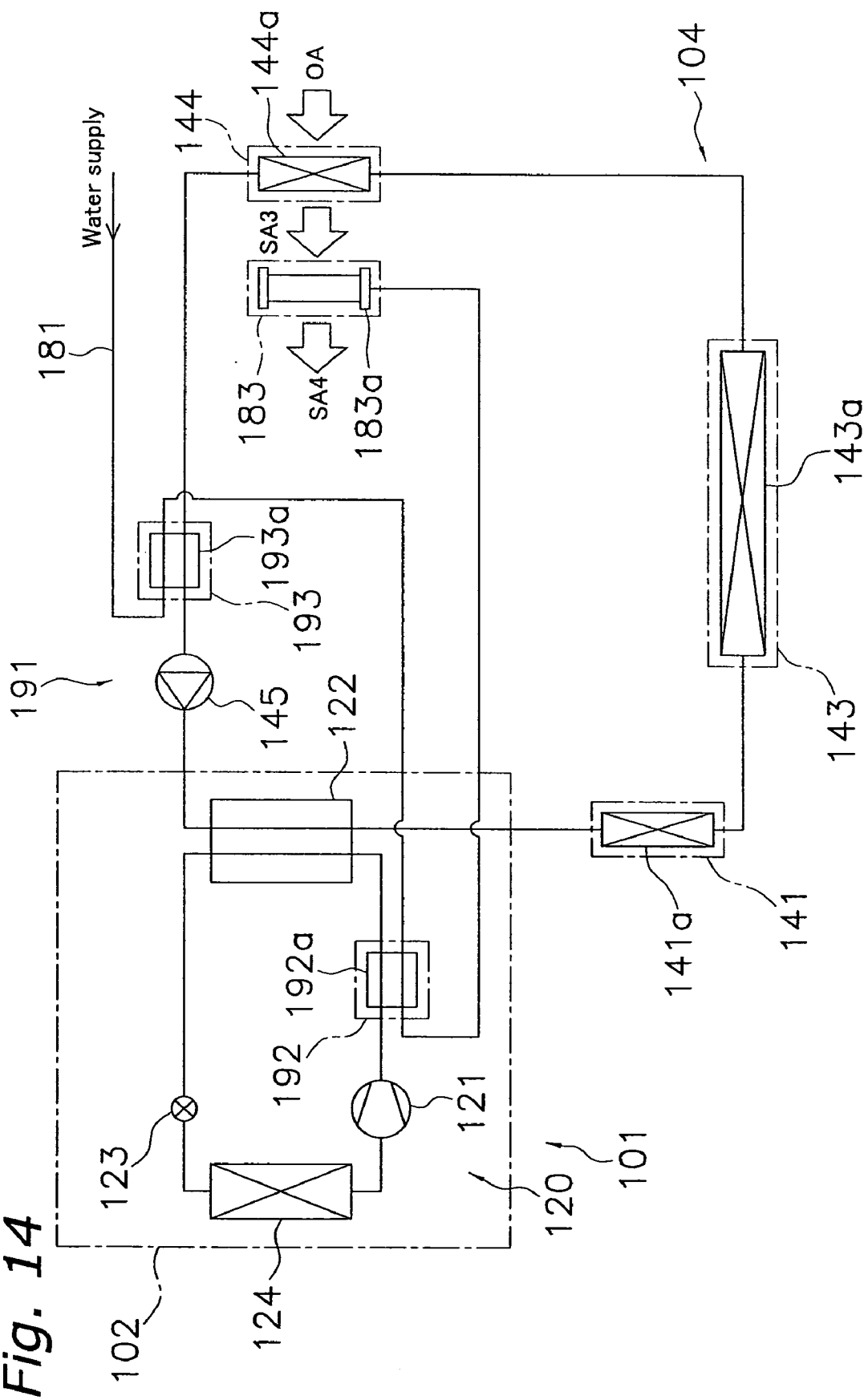
FIG. 14 is a schematic block diagram of an air conditioning system according to a modified example 4 of the present invention.

For example, the air conditioning system 101, as shown in FIG. 14, which does not include the fan convector 142 but includes the first supply water heat exchanger 192 connected to the refrigerant circuit 120 and the second supply water heat exchanger 193 (see FIG. 12) connected to the heating medium circuit 104, may be provided with a humidifier 183 comprising a moisture permeable film module 183a having a plurality of tube shaped moisture permeable films, and a water supply pipe 181 for supplying water to the moisture permeable film module 183a of the humidifier 183. Here, the moisture permeable film module 183a is provided with a passage such that the ventilation air that is heated by the outdoor air heating heat exchanging device 144 and then supplied to the room passes over the outside of the moisture permeable film. In addition, the inside of the moisture permeable film is configured such that water heated in the supply water heating device 191 and then supplied to the moisture permeable film module 183a is introduced therein, and is capable of humidifying the ventilation air by causing water that is supplied to the moisture permeable film to contact with the ventilation air via the moisture permeable film. As the moisture permeable film, polytetrafluoroethylene (PTFE) and the like may be used.

Also in this case, the ventilation air can be humidified by supplying water heated in the supply water heating device 191 to the moisture permeable film of the moisture permeable film module 183a of the humidifier 183 and by causing this supplied water to contact with the ventilation air via the moisture permeable film. Therefore, as in the above described embodiments and the modified examples, even when the absolute humidity of the ventilation air is lower than the absolute humidity of the room air, it is possible to prevent the room from becoming dry due to the supply of ventilation air to the room.

(8) Modified Example 5

In the air conditioning system 101 of the above described modified example 4, the outdoor air heating heat exchanging device 144 that heats the ventilation air that is supplied to the room by the air supply device 103 is connected to the heating medium circuit 104, however, this may be omitted, and the moisture permeable film module of the humidifier may be configured to function as an outdoor air heating heat exchanging device.

Figure 15:
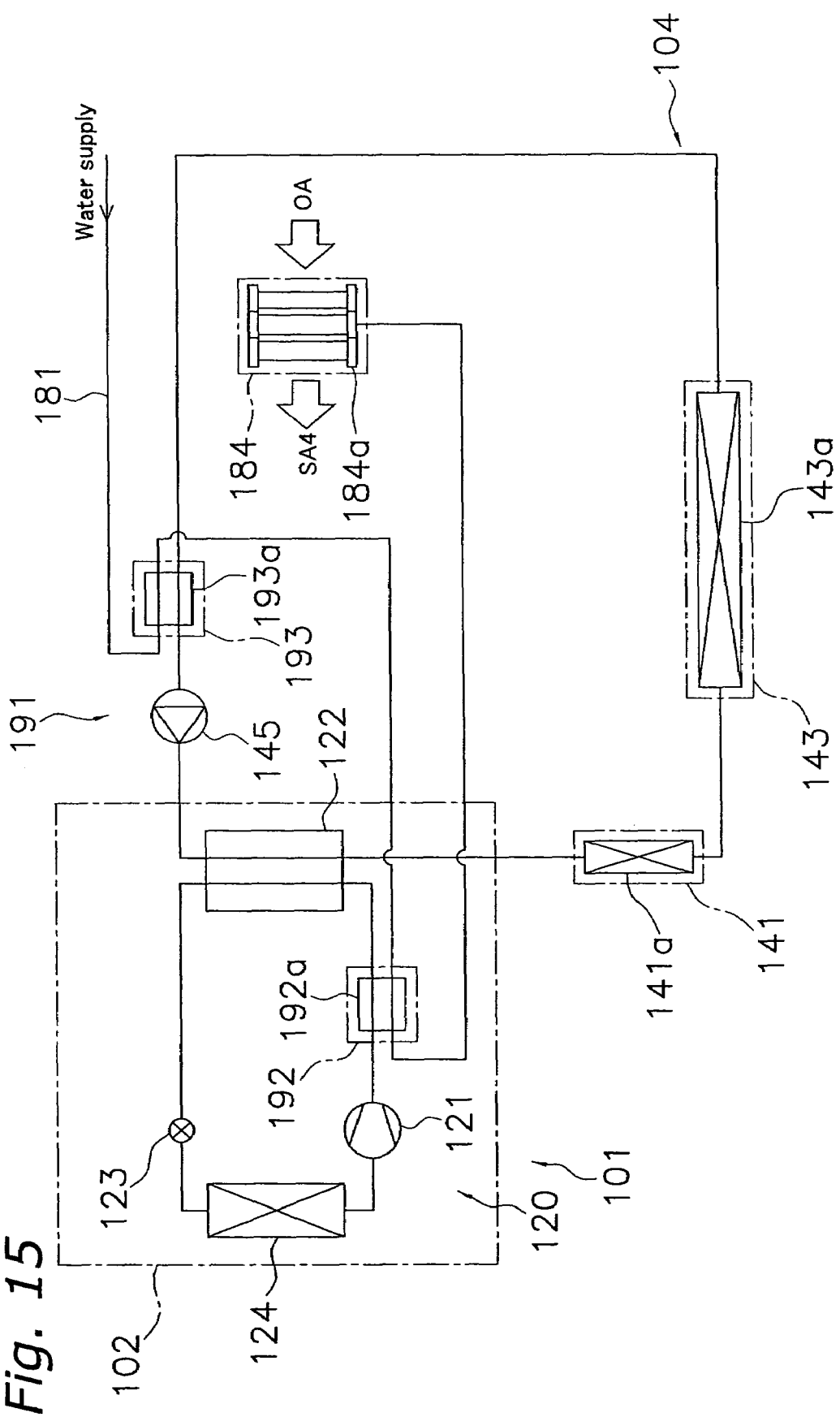
FIG. 15 is a schematic block diagram of an air conditioning system according to a modified example 5 of the present invention.

For example, in the air conditioning system 101, as shown in FIG. 15, which does not include the fan convector 142 but includes the first supply water heat exchanger 192 connected to the refrigerant circuit 120 and the second supply water heat exchanger 193 (see FIG. 12) connected to the heating medium circuit 104, the outdoor air heating heat exchanging device 144 may be omitted, and the ventilation air may be heated and humidified by causing water that is heated in the supply water heating device 191 and supplied to the moisture permeable film of the moisture permeable film module 184a to contact with the ventilation air via the moisture permeable film. Here, in order to facilitate heat exchange between ventilation air and water, it is desirable to increase the heat transfer area between ventilation air and water by, for example, increasing the size of a moisture permeable film module 184a.

Also in this case, it is possible to humidify the ventilation air by supplying water heated in the supply water heating device 191 to the moisture permeable film of the moisture permeable film module 184a of the humidifier 184 and by causing this supplied water to contact with the ventilation air via the moisture permeable film. Therefore, as in the above described embodiments and modified examples, even when the absolute humidity of the ventilation air is lower than the absolute humidity of the room air, it is possible to prevent the room from becoming dry due to the supply of ventilation air to the room.

(9) Modified Example 6

In the air conditioning system 101 of the above described modified example 5, the outdoor air heating heat exchanging device 144 is omitted, and also the moisture permeable film module 184a of the humidifier 184 is configured to function as an outdoor air heating heat exchanging device. However, further, water can be used as the heating medium in the heating medium circuit 104 and also the supply water heating device 191 can be omitted so that water that flows through the heating medium circuit 104 may be used as water that is supplied to the humidifier.

Figure 16:
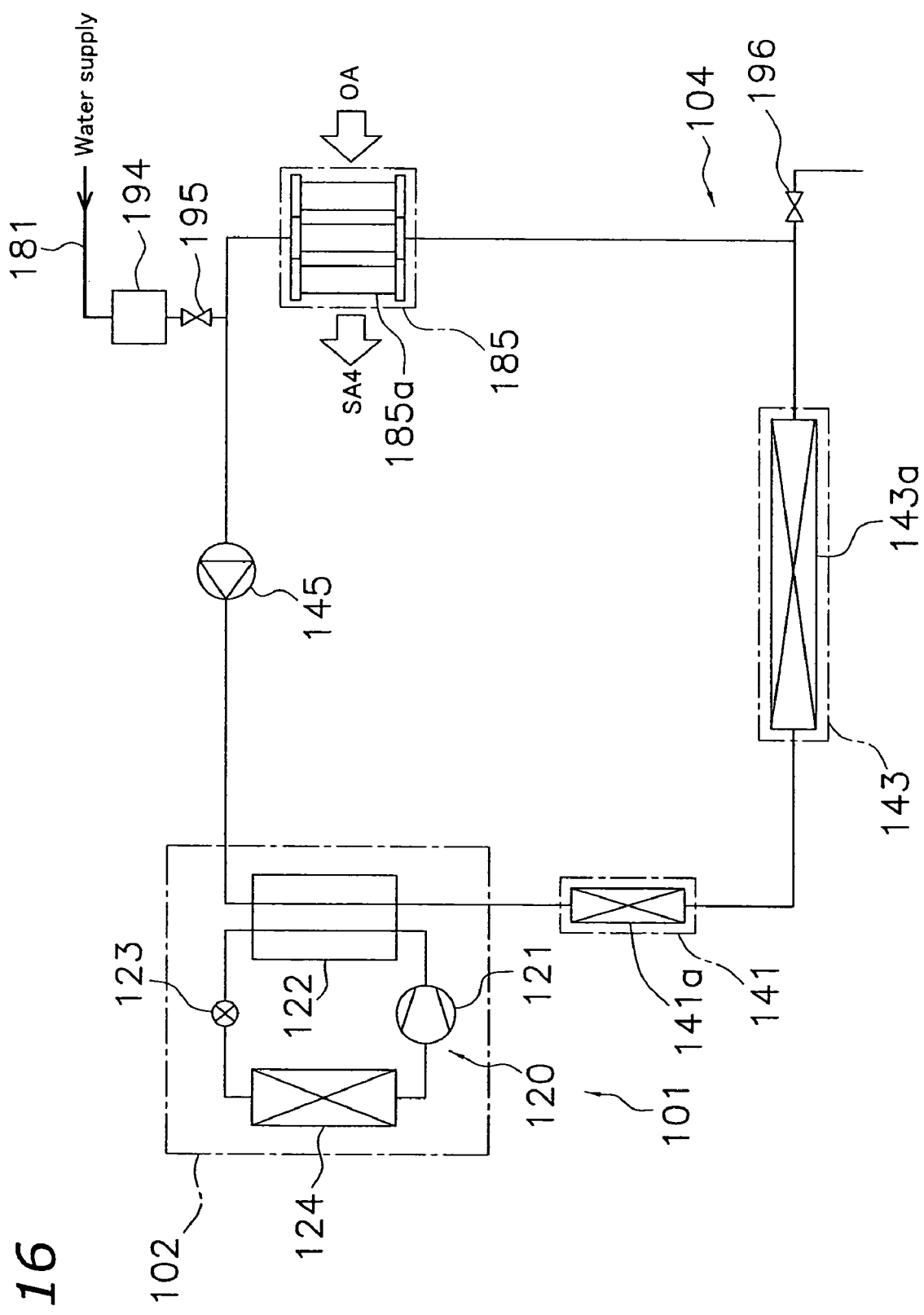
FIG. 16 is a schematic block diagram of an air conditioning system according to a modified example 6 of the present invention.

For example, in the air conditioning system 101, as shown in FIG. 16, which does not include the fan convector 142 but includes the first supply water heat exchanger 192 connected to the refrigerant circuit 120 and the second supply water heat exchanger 193 (see FIG. 12) connected to the heating medium circuit 104, the outdoor air heating heat exchanging device 144 and the supply water heating device 191 may be omitted, and a humidifier 185 having a moisture permeable film module 185a may be connected between the floor heating device 143 and the heating medium circulating pump 145 in the heating medium circuit 104 so as to cause water as the heating medium that circulates in the heating medium circuit 104 to pass into the moisture permeable film module 185a.

In this air conditioning system 101, the humidifier 185 having the moisture permeable film module 185a can both heat and humidify the ventilation air by causing water as the heating medium that circulates in the heating medium circuit 104 to contact with the ventilation air via the moisture permeable film. Accordingly, the humidifier 185 comprises a function of the supply water heating device. In this way, for example, the water supply pipe 181 for supplying water to the humidifier can be simplified, and this will enable simplification of the configuration of the air conditioning system 101. Specifically, as shown in FIG. 16, it will be possible to connect the water supply pipe 181 to the heating medium circuit 104 at the upstream of the heating medium circulating pump 145 via an expansion tank 194 and an inlet valve 195, so that the configuration can be simplified compared to the case in which the supply water heating device is provided. Note that, in this modified example, as shown in FIG. 16, water as the heating medium that flows through the heating medium circuit 104 is supplied to the humidifier 185, so that it is desirable that the heating medium circuit 104 is provided with a discharge valve in order to discharge a certain amount of water from the heating medium circuit 104 for the purpose of water quality management.

Figure 17:
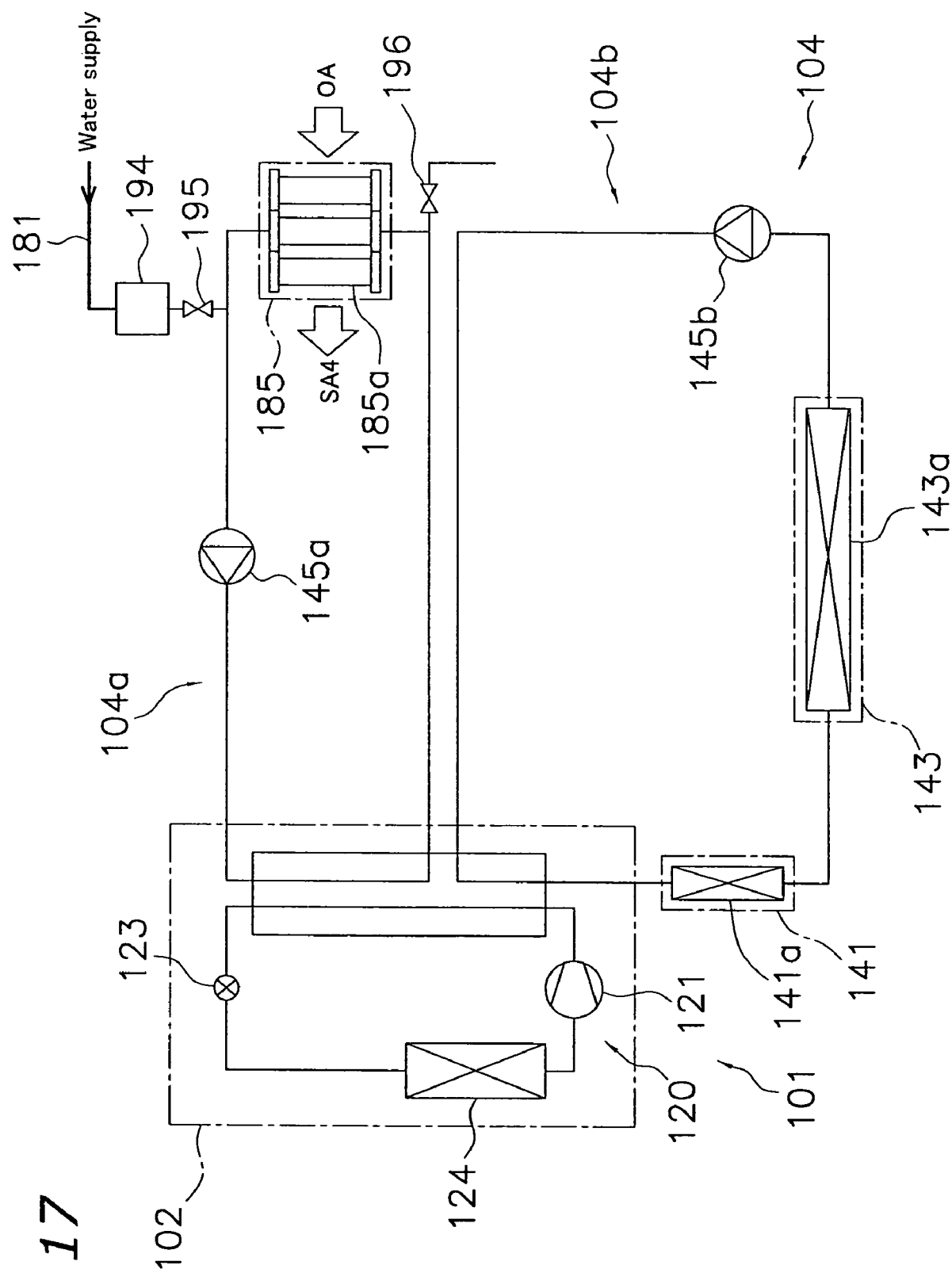
FIG. 17 is a schematic block diagram of an air conditioning system according to the modified example 6 of the present invention.

In addition, for example, as in the air conditioning system 101 shown in FIG. 17, the heating medium circuit 104 of the air conditioning system shown in FIG. 16 may be divided into a first divided heating medium circuit 104a that circulates the heating medium between the humidifier 185 and the heating medium—refrigerant heat exchanger 122, and a second divided heating medium circuit 104b that circulates the heating medium between the radiator 141 and the floor heating device 143 and the heating medium—refrigerant heat exchanger 122.

In this air conditioning system 101, the first divided heating medium circuit 104a to which the humidifier 185 is connected is a system different from the second divided heating medium circuit 104b to which the radiator 141 and the floor heating device 143 are connected, so that it is possible to make the second divided heating medium circuit 104b as a closed circulation circuit.

(10) Other Embodiments

While a preferred embodiment of the present invention has been described with reference to the figures, the scope of the present invention is not limited to the above embodiment, and the various changes and modifications may be made without departing from the scope of the present invention.

For example, the air conditioning system of the above described embodiment uses, as a heat source unit, a heat source unit that has a refrigerant circuit dedicated to heating. However, a heat source unit capable of switchably performing cooling and heating operations may be used.

INDUSTRIAL APPLICABILITY

Application of the present invention will enable, in the air conditioning system capable of heating the room, the prevention of a decrease in the humidity in the room caused by the ventilation air that is supplied to the room to ventilate the room.

The invention claimed is:

1. An air conditioning system capable of heating a room, comprising:
    a heat source unit having a vapor compression refrigerant circuit including a compressor, a heat source side heat exchanger, an expansion mechanism, and a utilization side heat exchanger fluidly connected to each other to circulate a refrigerant within the vapor compression refrigerant circuit, the heat source unit being configured to heat a heating medium in the utilization side heat exchanger, the heating medium being a different material from the refrigerant;
    an air supply device that supplies an outside air into the room as a ventilation air;
    a water supply humidifier arranged and configured to humidify the ventilation air supplied by the air supply device;
    a heating medium circuit having at least one room heating device that releases the heat of the heating medium heated in the utilization side heat exchanger to room air within the room, the heating medium circuit being configured to circulate the heating medium between the room heating device and the utilization side heat exchanger; and
    a supply water heating device that uses the heat generated from the heat source unit in order to heat water to be used in the humidifier,
    the supply water heating device including a first supply water heating device and a second supply water heating device,
    the first and second supply water heating devices being connected to the heating medium circuit,
    the heating medium circuit being connected to the utilization side heat exchanger such that the heating medium is sequentially supplied to the first supply water heating device, the room heating device, and the second supply water heating device, and
    the water to be used in the humidifier being sequentially supplied to the second supply water heating device and the first supply water heating device.

2. An air conditioning system capable of heating a room, comprising:
    a heat source unit having a vapor compression refrigerant circuit including a compressor, a heat source side heat exchanger, an expansion mechanism, and a utilization side heat exchanger fluidly connected to each other to circulate a refrigerant within the vapor compression refrigerant circuit, the heat source unit being configured to heat a heating medium in the utilization side heat exchanger, the heating medium being a different material from the refrigerant;
    an air supply device that supplies an outside air into the room as a ventilation air;
    a water supply humidifier arranged and configured to humidify the ventilation air supplied by the air supply device;
    a heating medium circuit having at least one room heating device that releases the heat of the heating medium heated in the utilization side heat exchanger to room air within the room, the heating medium circuit being configured to circulate the heating medium between the room heating device and the utilization side heat exchanger; and a supply water heating device that uses the heat generated from the heat source unit in order to heat water to be used in the humidifier, the supply water heating device including a first supply water heating device and a second supply water heating device, the first supply water heating device being connected to the refrigerant circuit such that the refrigerant sent from the compressor to the utilization side heat exchanger is supplied to the first supply water heating device, the second supply water heating device being connected to the refrigerant circuit such that the refrigerant sent from the utilization side heat exchanger to the expansion mechanism is supplied to the second supply water heating device, and the water to be used in the humidifier being sequentially supplied to the second supply water heating device and the first supply water heating device.

3. An air conditioning system capable of heating a room, comprising:

a heat source unit having a vapor compression refrigerant circuit including a compressor, a heat source side heat exchanger, an expansion mechanism, and a utilization side heat exchanger fluidly connected to each other to circulate a refrigerant within the vapor compression refrigerant circuit, the heat source unit being configured to heat a heating medium in the utilization side heat exchanger, the heating medium being a different material from the refrigerant;

an air supply device that supplies an outside air into the room as a ventilation air;

a water supply humidifier arranged and configured to humidify the ventilation air supplied by the air supply device;

a heating medium circuit having at least one room heating device that releases the heat of the heating medium heated in the utilization side heat exchanger to room air within the room, the heating medium circuit being configured to circulate the heating medium between the room heating device and the utilization side heat exchanger; and a supply water heating device that uses the heat generated from the heat source unit in order to heat water to be used in the humidifier, the supply water heating device including a first supply water heating device and a second supply water heating device, the first supply water heating device being connected to the refrigerant circuit such that the refrigerant sent from the compressor to the utilization side heat exchanger is supplied to the first supply water heating device, the second supply water heating device being connected to the heating medium circuit, the heating medium circuit being connected to the utilization side heat exchanger such that the heating medium is sequentially supplied to the room heating device and the second supply water heating device, and the water to be used in the humidifier being sequentially supplied to the second supply water heating device and the first supply water heating device.

4. An air conditioning system capable of heating a room, comprising:

a heat source unit having a vapor compression refrigerant circuit including a compressor, a heat source side heat exchanger, an expansion mechanism, and a utilization side heat exchanger fluidly connected to each other to circulate a refrigerant within the vapor compression refrigerant circuit, the heat source unit being configured to heat a heating medium in the utilization side heat exchanger, the heating medium being a different material from the refrigerant;

an air supply device that supplies an outside air into the room as a ventilation air;

a water supply humidifier arranged and configured to humidify the ventilation air supplied by the air supply device;

a heating medium circuit having at least one room heating device that releases the heat of the heating medium heated in the utilization side heat exchanger to room air within the room, the heating medium circuit being configured to circulate the heating medium between the room heating device and the utilization side heat exchanger; and a supply water heating device that uses the heat generated from the heat source unit in order to heat water to be used in the humidifier, the supply water heating device including a first supply water heating device and a second supply water heating device, the first supply water heating device being connected to the heating medium circuit, the heating medium circuit being connected to the utilization side heat exchanger such that the heating medium is sequentially supplied to the first supply water heating device and the room heating device, the second supply water heating device being connected to the refrigerant circuit such that the refrigerant sent from the utilization side heat exchanger to the expansion mechanism is supplied to the second supply water heating device, and the water to be used in the humidifier being sequentially supplied to the second supply water heating device and the first supply water heating device.

5. The air conditioning system according to claim 3, wherein the humidifier includes a moisture permeable film that allows moisture to permeate therethrough, and is configured to humidify the ventilation air by causing water heated by the supply water heating device to contact with the ventilation air via the moisture permeable film.

6. The air conditioning system according to claim 1, wherein the refrigerant that flows through the refrigerant circuit includes $CO_2$.

7. The air conditioning system according to claim 1, wherein the air supply device includes an outdoor air heating heat exchanger that releases the heat of the heating medium heated in the utilization side heat exchanger to the outside air that is supplied into the room as the ventilation air, and the heating medium circuit circulates the heating medium between the room heating device, the outdoor air heating heat exchanger and the utilization side heat exchanger.

8. The air conditioning system according to claim 7, wherein the heating medium circuit is arranged and configured so that the room heating device receives the heating medium from the utilization side heat exchanger before the outdoor air heating heat exchanger.

9. The air conditioning system according to claim 8, wherein the heating medium circuit includes a plurality of room heating devices connected in series such that the outdoor air heating heat exchanger receives the heating medium from the utilization side heat exchanger after the room heating devices.

10. The air conditioning system according to claim 9, wherein
a first of the room heating devices connected in series receives the heating medium directly from the utilization side heat exchanger without any additional heating devices heating the heating medium therebetween.

11. The air conditioning system according to claim 7, wherein
the heating medium circuit includes a plurality of room heating devices connected in series.

12. The air conditioning system according to claim 11, wherein
a first of the room heating devices connected in series receives the heating medium directly from the utilization side heat exchanger without any additional heating devices heating the heating medium therebetween.

13. The air conditioning system according to claim 2, wherein
the refrigerant that flows through the refrigerant circuit includes $CO_2$.

14. The air conditioning system according to claim 2, wherein
the air supply device includes an outdoor air heating heat exchanger that releases the heat of the heating medium heated in the utilization side heat exchanger to the outside air that is supplied into the room as the ventilation air, and
the heating medium circuit circulates the heating medium between the room heating device, the outdoor air heating heat exchanger and the utilization side heat exchanger.

15. The air conditioning system according to claim 14, wherein
the heating medium circuit is arranged and configured so that the room heating device receives the heating medium from the utilization side heat exchanger before the outdoor air heating heat exchanger.

16. The air conditioning system according to claim 3, wherein
the refrigerant that flows through the refrigerant circuit includes $CO_2$.

17. The air conditioning system according to claim 3, wherein
the air supply device includes an outdoor air heating heat exchanger that releases the heat of the heating medium heated in the utilization side heat exchanger to the outside air that is supplied into the room as the ventilation air, and
the heating medium circuit circulates the heating medium between the room heating device, the outdoor air heating heat exchanger and the utilization side heat exchanger.

18. The air conditioning system according to claim 17, wherein
the heating medium circuit is arranged and configured so that the room heating device receives the heating medium from the utilization side heat exchanger before the outdoor air heating heat exchanger.

19. The air conditioning system according to claim 4, wherein
the refrigerant that flows through the refrigerant circuit includes $CO_2$.

20. The air conditioning system according to claim 4, wherein
the air supply device includes an outdoor air heating heat exchanger that releases the heat of the heating medium heated in the utilization side heat exchanger to the outside air that is supplied into the room as the ventilation air, and
the heating medium circuit circulates the heating medium between the room heating device, the outdoor air heating heat exchanger and the utilization side heat exchanger.

21. The air conditioning system according to claim 20, wherein
the heating medium circuit is arranged and configured so that the room heating device receives the heating medium from the utilization side heat exchanger before the outdoor air heating heat exchanger.

* * * * *